United States Patent
Park et al.

(10) Patent No.: US 10,505,400 B2
(45) Date of Patent: *Dec. 10, 2019

(54) WIRELESS POWER TRANSMITTER AND RECEIVER FOR VEHICLE

(71) Applicant: LG ELECTRONICS INC., Seoul (KR)

(72) Inventors: Jinmoo Park, Seoul (KR); Jeongkyo Seo, Seoul (KR); Beomseok Chae, Seoul (KR); Jaesung Lee, Seoul (KR); Jihyun Lee, Seoul (KR); Dohyeon Son, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 31 days.

This patent is subject to a terminal disclaimer.

(21) Appl. No.: 15/639,665

(22) Filed: Jun. 30, 2017

(65) Prior Publication Data

US 2017/0297438 A1 Oct. 19, 2017

Related U.S. Application Data

(63) Continuation-in-part of application No. 15/541,180, filed as application No. PCT/KR2016/012682 on Nov. 4, 2016.
(Continued)

(51) Int. Cl.
*H01F 27/42* (2006.01)
*H01F 37/00* (2006.01)
(Continued)

(52) U.S. Cl.
CPC .............. *H02J 50/12* (2016.02); *B60L 53/12* (2019.02); *B60L 53/38* (2019.02); *H01F 38/14* (2013.01);
(Continued)

(58) Field of Classification Search
CPC . H02J 7/025; H02J 50/90; H02J 50/12; Y02T 90/122; B60L 11/182;
(Continued)

(56) References Cited

U.S. PATENT DOCUMENTS 9,130,395 B2 9/2015 Jung
2012/0098486 A1 4/2012 Jung
(Continued)

FOREIGN PATENT DOCUMENTS

JP 2009-252970 A 10/2009
JP 2012-186949 A 9/2012
(Continued)

*Primary Examiner* — Rexford N Barnie
*Assistant Examiner* — Rasem Mourad
(74) *Attorney, Agent, or Firm* — Birch, Stewart, Kolasch & Birch, LLP

(57) ABSTRACT

According to an embodiment of present invention, a wireless power transmitter for a vehicle that transfers power to a wireless power comprising: a resonance circuit comprising a coil assembly and/or a capacitor, wherein the coil assembly comprises first and second bottom coils placed adjacent to each other in a line and each consisting of a single layer of 11 turns and a top coil stacked on the first and second bottom coils and consisting of a single layer of 12 turns; a frequency full bridge driver driving each of coils included in the coil assembly individually, and a placement detection unit detecting a placement of the wireless power receiver.

6 Claims, 27 Drawing Sheets

| Parameter | Symbol | Value |
|---|---|---|
| Top coil is placed alongside from a bottom coil with a displacement | $d_{bt}$ | 23±2mm |
| Bottom coils are placed alongside each other with a displacement | $d_{12}$ | 46±4mm |
| Self Inductance[@1V, 100kHz] of Primary Coil | $L_p$ | 11.3±0.7μH |
| Distance from the top surface of primary coil to interface surface of base-station | $d_z$ | 5.5±1.5mm |

(a)

(b)

| Parameter | Symbol | Value |
|---|---|---|
| Outer length | $d_{ol}$ | 49.0±1.0mm |
| Inner length | $d_{il}$ | 26.0±1.0mm |
| Outer width | $d_{ow}$ | 44.0±1.0mm |
| Inner width | $d_{iw}$ | 22.0±1.0mm |
| Thickness | $d_c$ | 1.1±0.2mm |
| Number of turns per layer | N | 11 |
| Number of layers | – | 1 |

Parameters of transmitter bottom coil (close to ferrite)

| Parameter | Symbol | Value |
|---|---|---|
| Outer length | $d_{ol}$ | 46.0±1.0mm |
| Inner length | $d_{il}$ | 21.0±1.0mm |
| Outer width | $d_{ow}$ | 49.5±1.0mm |
| Inner width | $d_{iw}$ | 25.5±1.0mm |
| Thickness | $d_c$ | 1.1±0.2mm |
| Number of turns per layer | N | 12 |
| Number of layers | – | 1 |

Parameters of transmitter top coil (close to interface)

Related U.S. Application Data

(60) Provisional application No. 62/251,118, filed on Nov. 5, 2015.

(51) Int. Cl.
| | |
|---|---|
| *H01F 38/00* | (2006.01) |
| *H02J 50/12* | (2016.01) |
| *H02J 5/00* | (2016.01) |
| *H01F 38/14* | (2006.01) |
| *H02J 7/02* | (2016.01) |
| *H02J 50/90* | (2016.01) |
| *B60L 53/12* | (2019.01) |
| *B60L 53/38* | (2019.01) |

(52) U.S. Cl.
CPC .............. *H02J 5/005* (2013.01); *H02J 7/025* (2013.01); *H02J 50/90* (2016.02); *Y02T 10/7005* (2013.01); *Y02T 10/7072* (2013.01); *Y02T 90/12* (2013.01); *Y02T 90/121* (2013.01); *Y02T 90/122* (2013.01); *Y02T 90/125* (2013.01); *Y02T 90/14* (2013.01)

(58) Field of Classification Search
CPC ...... B60L 11/1829; B60L 53/12; B60L 53/38; H01F 38/14
See application file for complete search history.

(56) References Cited

U.S. PATENT DOCUMENTS

| | | |
|---|---|---|
| 2012/0242160 A1 | 9/2012 | Tseng |
| 2013/0015719 A1* | 1/2013 | Jung .................... H04B 5/0037 307/104 |
| 2013/0260676 A1* | 10/2013 | Singh .................. H04B 5/0037 455/41.1 |
| 2013/0328412 A1 | 12/2013 | Meins et al. |
| 2014/0009109 A1* | 1/2014 | Lee ......................... H01F 38/14 320/108 |
| 2014/0070622 A1 | 3/2014 | Keeling et al. |
| 2015/0130409 A1 | 5/2015 | Lee et al. |
| 2015/0145635 A1 | 5/2015 | Kurz et al. |
| 2016/0308397 A1 | 10/2016 | Jung et al. |
| 2016/0336807 A1* | 11/2016 | Mach ..................... H02J 5/005 |

FOREIGN PATENT DOCUMENTS

| | | |
|---|---|---|
| JP | 2015-111996 A | 6/2015 |
| KR | 10-2012-0103309 A | 9/2012 |
| KR | 10-1213090 B1 | 12/2012 |
| KR | 10-2015-0069440 A | 6/2015 |
| KR | 10-2015-0082419 A | 7/2015 |
| KR | 10-2015-0093588 A | 8/2015 |
| WO | WO 2015/021144 A1 | 2/2015 |

\* cited by examiner

[FIG. 1]
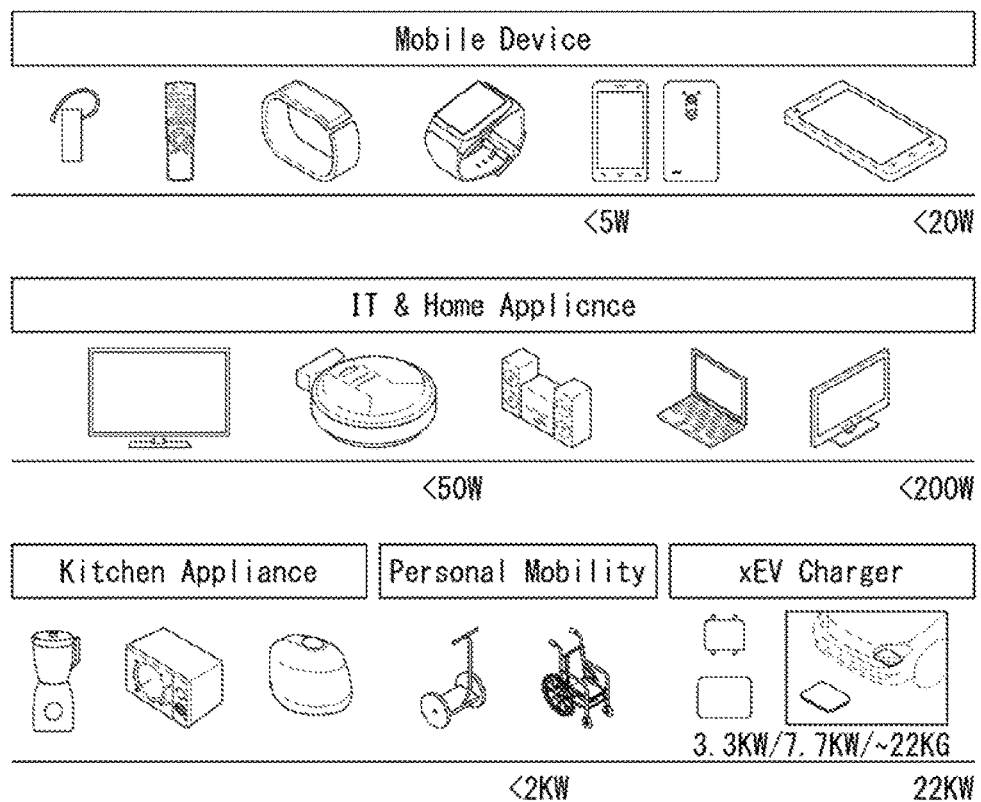

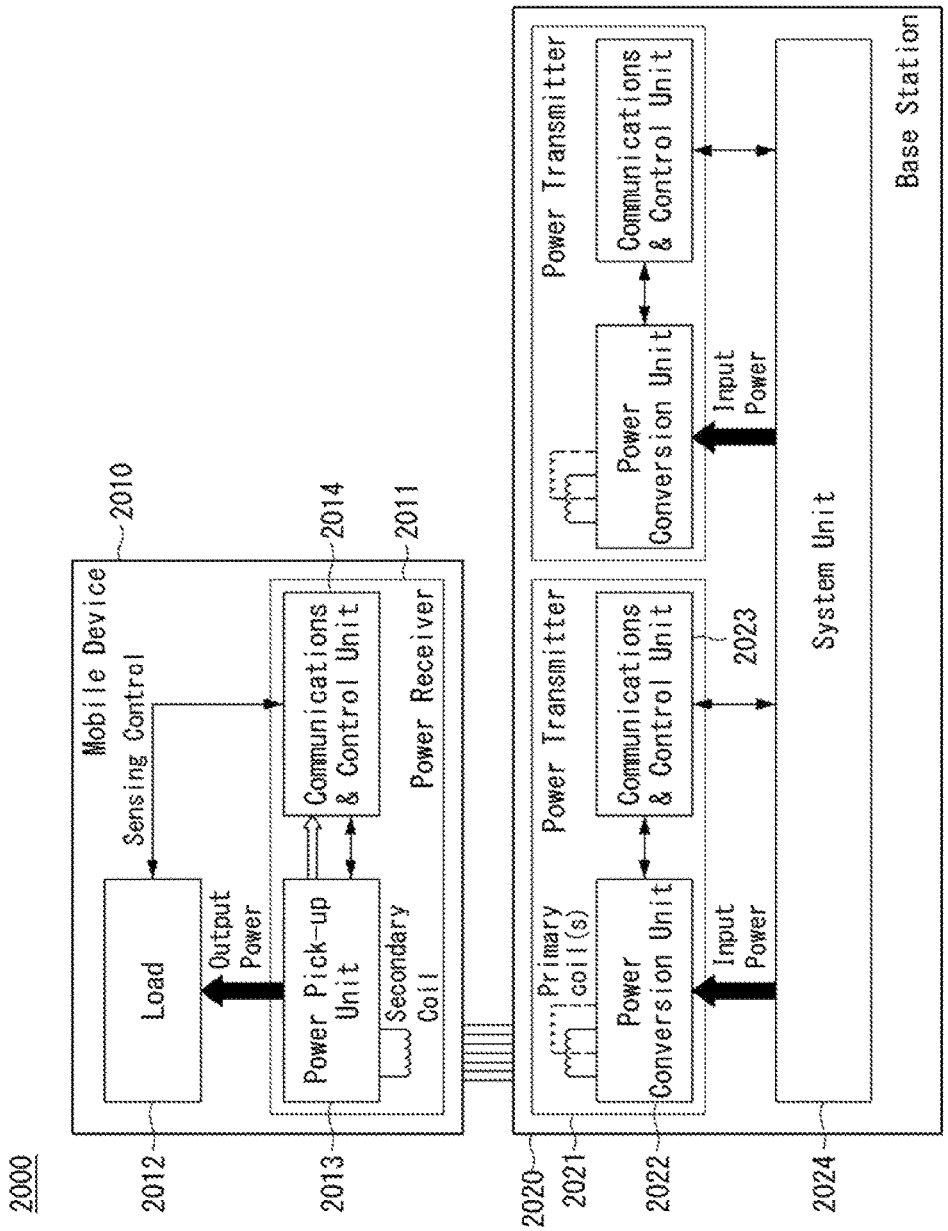
[FIG. 2]

[FIG. 3]
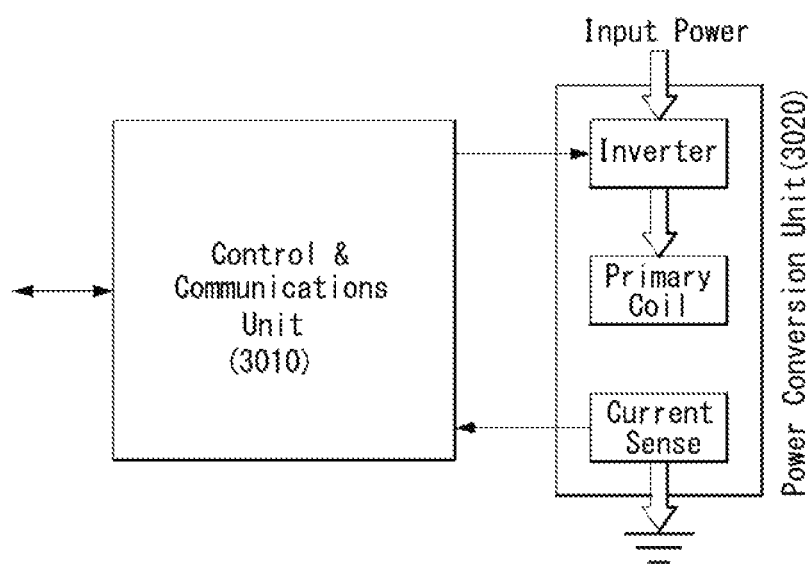

[FIG. 4]
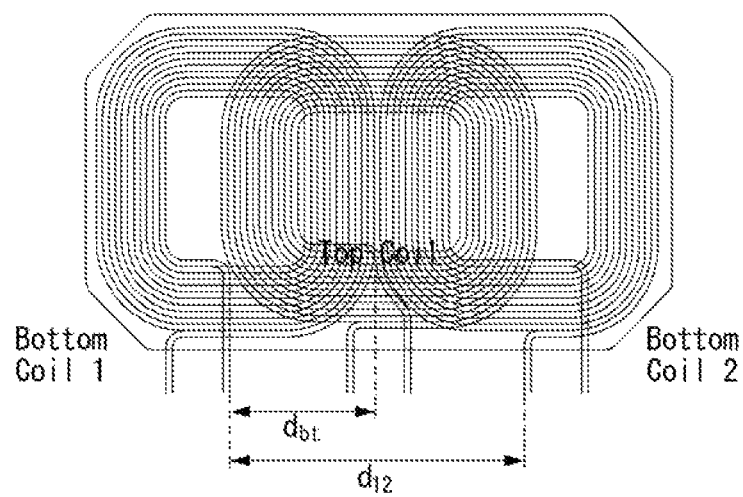
| Parameter | Symbol | Value |
|---|---|---|
| Top coil is placed alongside from a bottom coil with a displacement | $d_{bt}$ | 23±2mm |
| Bottom coils are placed alongside each other with a displacement | $d_{12}$ | 46±4mm |
| Self Inductance[@1V,100kHz] of Primary Coil | $L_P$ | 11.3±0.7 $\mu$H |
| Distance from the top surface of primary coil to interface surface of base-station | $d_z$ | 5.5±1.5mm |

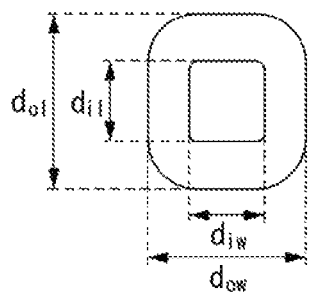

| Parameter | Symbol | Value |
|---|---|---|
| Outer length | $d_{ol}$ | 49.0±1.0mm |
| Inner length | $d_{il}$ | 26.0±1.0mm |
| Outer width | $d_{ow}$ | 44.0±1.0mm |
| Inner width | $d_{iw}$ | 22.0±1.0mm |
| Thickness | $d_c$ | 1.1±0.2mm |
| Number of turns per layer | N | 11 |
| Number of layers | – | 1 |

Parameters of transmitter bottom coil
(close to ferrite)

(b)

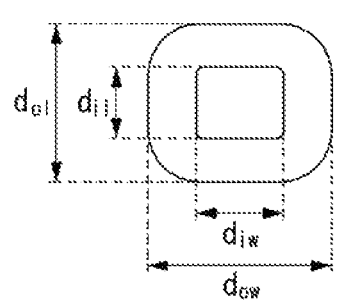

| Parameter | Symbol | Value |
|---|---|---|
| Outer length | $d_{ol}$ | 46.0±1.0mm |
| Inner length | $d_{il}$ | 21.0±1.0mm |
| Outer width | $d_{ow}$ | 49.5±1.0mm |
| Inner width | $d_{iw}$ | 25.5±1.0mm |
| Thickness | $d_c$ | 1.1±0.2mm |
| Number of turns per layer | N | 12 |
| Number of layers | – | 1 |

Parameters of transmitter top coil
(close to interface)

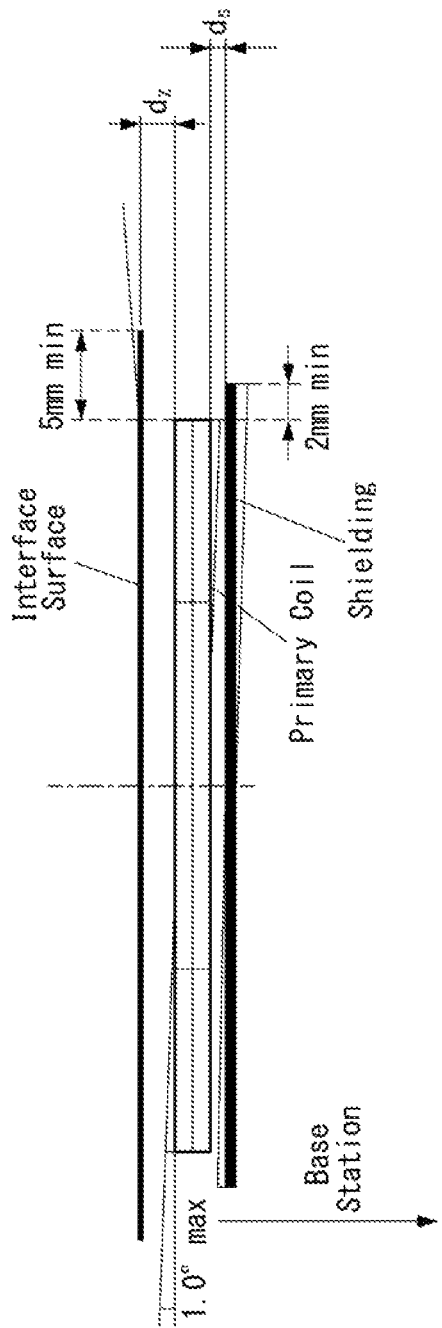
[FIG. 6]

[FIG. 7]
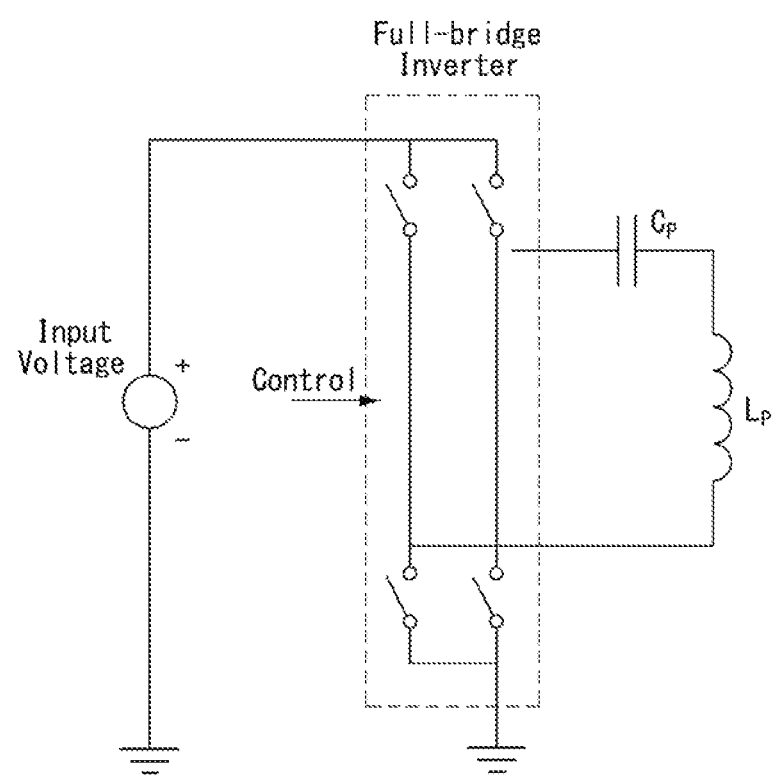

[FIG. 8a]

3.3. Summary

3.3.1. Conformance to Communication Interface

Load Modulation

| Testcase | Name | Date | Setup | Result |
|---|---|---|---|---|
| Req #1 | Load Modulation | Oct-2015 | 001A | PASS |

3.3.2. Conformance to System Control

Selection Phase

| Testcase | Name | Date | Setup | Result |
|---|---|---|---|---|
| Req #2 | Interface definition requirement | Oct-2015 | 001A | N/A |

Ping Phase

| Testcase | Name | Date | Setup | Result |
|---|---|---|---|---|
| Req #3 | a: Power Signal Characteristics | Oct-2015 | 001A | PASS |
| | b: Power Signal Characteristics | Oct-2015 | 001B | PASS |
| | c: Power Signal Characteristics | Oct-2015 | 001C | PASS |
| | d: Power Signal Characteristics | Oct-2015 | 001D | PASS |
| Req #4 | No Response | Oct-2015 | 001A | PASS |
| Req #5 | Signal Strength | Oct-2015 | 001A | PASS |
| Req #6 | Termination | Oct-2015 | 001A | PASS |
| | a: Termination | Oct-2015 | 001A | PASS |
| Req #7 | a: Termination | Oct-2015 | 001A | PASS |
| | b: Termination | Oct-2015 | 001A | PASS |
| | c: Termination | | | |

Identification and Configuration Phase

| Testcase | Name | Date | Setup | Result |
|---|---|---|---|---|
| Req #8 | a. Packet Sequence | Oct-2015 | 001A | PASS |
| | b. Packet Sequence | Oct-2015 | 001A | PASS |
| | c. Packet Sequence | Oct-2015 | 001A | PASS |
| | d. Packet Sequence | Oct-2015 | 001A | PASS |
| Req #9 | Packet Timing | Oct-2015 | 001A | PASS |
| Req #10 | Packet Timing | Oct-2015 | 001A | N/A |
| Req #11 | Communication Error | Oct-2015 | 001A | PASS |
| Req #12 | Packet Content | Oct-2015 | 001A | N/A |
| Req #13 | Packet Content | Oct-2015 | 001A | PASS |
| | a: Packet Content | Oct-2015 | 001A | PASS |
| | b: Packet Content | Oct-2015 | 001A | PASS |
| | c: Packet Content | Oct-2015 | 001A | PASS |
| Req #14 | Packet Content | Oct-2015 | 001A | PASS |
| Req #15 | Power Transfer Contract | Oct-2015 | 001A | N/A |

[FIG. 8b]

*Power Transfer Phase*

| Testcase | Name | Date | Setup | Result |
|---|---|---|---|---|
| Req #16 | Packet Sequence | Oct-2015 | 001A | PASS |
| | a: Packet Sequence | Oct-2015 | 001A | PASS |
| | b: Packet Sequence | Oct-2015 | 001A | PASS |
| Req #17 | a: Packet Timing | Oct-2015 | 001A | PASS |
| | b: Packet Timing | Oct-2015 | 001A | PASS |
| Req #18 | Packet Timing | Oct-2015 | 001A | PASS |
| Req #19 | Packet Content | Oct-2015 | 001A | N/A |
| Req #20 | a: Power Control | Oct-2015 | 001B | PASS |
| | b: Power Control | Oct-2015 | 001B | PASS |
| Req #21 | Power Control | Oct-2015 | 001B | PASS |
| Req #22 | Termination | Oct-2015 | 001A | PASS |
| | a: Termination | Oct-2015 | 001A | PASS |

3.3.3. Conformance to System Performance

*Guaranteed Power*

| Testcase | Name | Date | Setup | Result |
|---|---|---|---|---|
| Req #23 | a: Guaranteed Power | Oct-2015 | 001A | PASS |
| | b: Guaranteed Power | Oct-2015 | 001B | PASS |
| | c: Guaranteed Power | Oct-2015 | 001C | PASS |
| | d: Guaranteed Power | Oct-2015 | 001D | PASS |
| | e: Guaranteed Power | Oct-2015 | 001E | PASS |
| | f: Guaranteed Power | Oct-2015 | TPR#5 | PASS |

*Thermal Performance*

| Testcase | Name | Date | Setup | Result |
|---|---|---|---|---|
| Req #24 | Thermal Performance | Oct-2015 | 002A | N/A |

*Foreign Object Detection*

| Testcase | Name | Date | Setup | Result |
|---|---|---|---|---|
| Req #25 | a: Performance requirement | Oct-2015 | TPR#5 | PASS |
| | b: Performance requirement | Oct-2015 | TPR#5 | PASS |
| | c: Performance requirement | Oct-2015 | TPR#5 | PASS |
| | d: Performance requirement | Oct-2015 | TPR#5 | PASS |

*User Interface*

| Testcase | Name | Date | Setup | Result |
|---|---|---|---|---|
| Req #26 | Object Placed | Oct-2015 | 001A | PASS |
| Req #27 | Transfer in Progress | Oct-2015 | 001A | N/A |
| Req #28 | Transfer Complete | Oct-2015 | 001A | PASS |
| Req #29 | Fault | Oct-2015 | 001A | PASS |
| Req #30 | Multiple Devices | Oct-2015 | 001A | N/A |
| Req #31 | Performance requirement | Oct-2015 | 001A | N/A |

| Measurements | Vr (V) |
|---|---|
| #1 | 4.202 |
| #2 | 4.188 |
| #3 | 4.196 |
| Average | 4.195 |

Test Result (: Pass )/Fail (b)

| Measurements | Vr (V) |
|---|---|
| #1 | 6.917 |
| #2 | 6.923 |
| #3 | 6.945 |
| Average | 6.928 |

Test Result ( Pass )/Fail (c)

| Measurements | Vr (V) |
|---|---|
| #1 | 4.205 |
| #2 | 4.197 |
| #3 | 4.201 |
| Average | 4.201 |

Test Result (: Pass )/Fail (d)

| Measurements | Vr (V) |
|---|---|
| #1 | 7.464 |
| #2 | 7.524 |
| #3 | 7.489 |
| Average | 7.492 |

Test Result ( Pass )/Fail (e)

| Measurements | Vr (V) |
|---|---|
| #1 | 5.015 |
| #2 | 5.004 |
| #3 | 4.986 |
| Average | 5.002 |

Test Result (: Pass )/Fail (f)

| Measurements | Vr (V) |
|---|---|
| #1 | 5.007 |
| #2 | 4.982 |
| #3 | 4.969 |
| Average | 4.986 |

Test Result (: Pass )/Fail

[FIG. 10a]
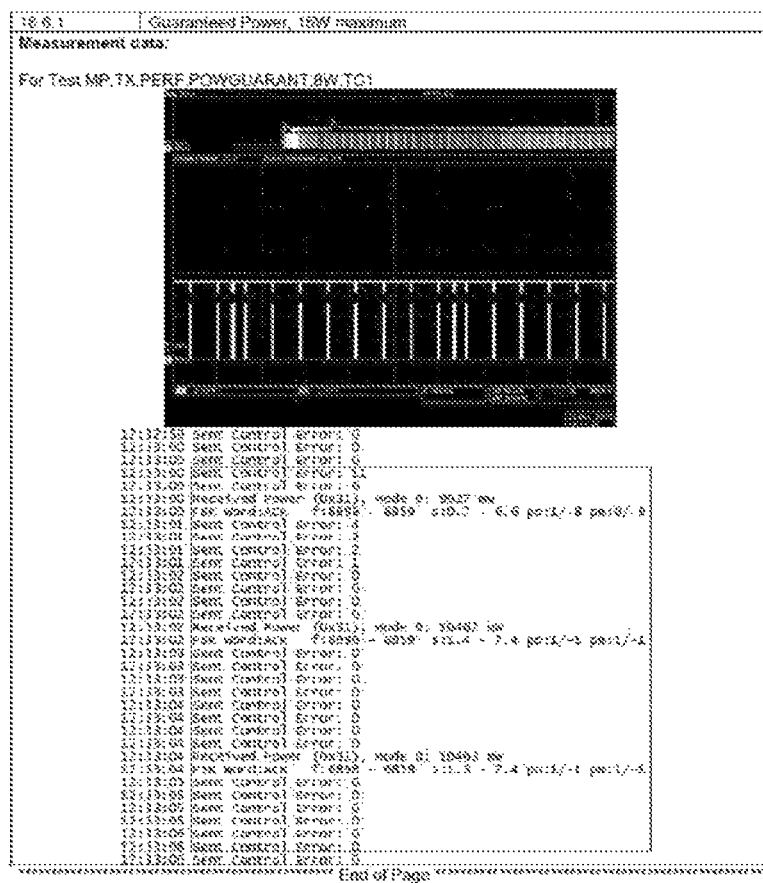
(a) 8W

[FIG. 10b]
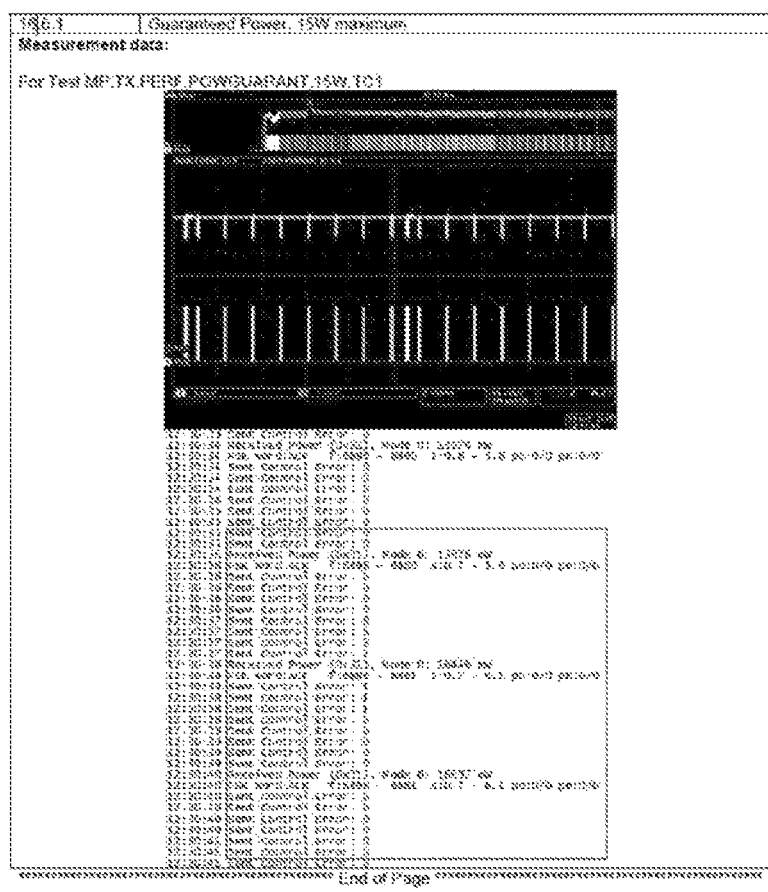
(b) 15W

[FIG. 11a]
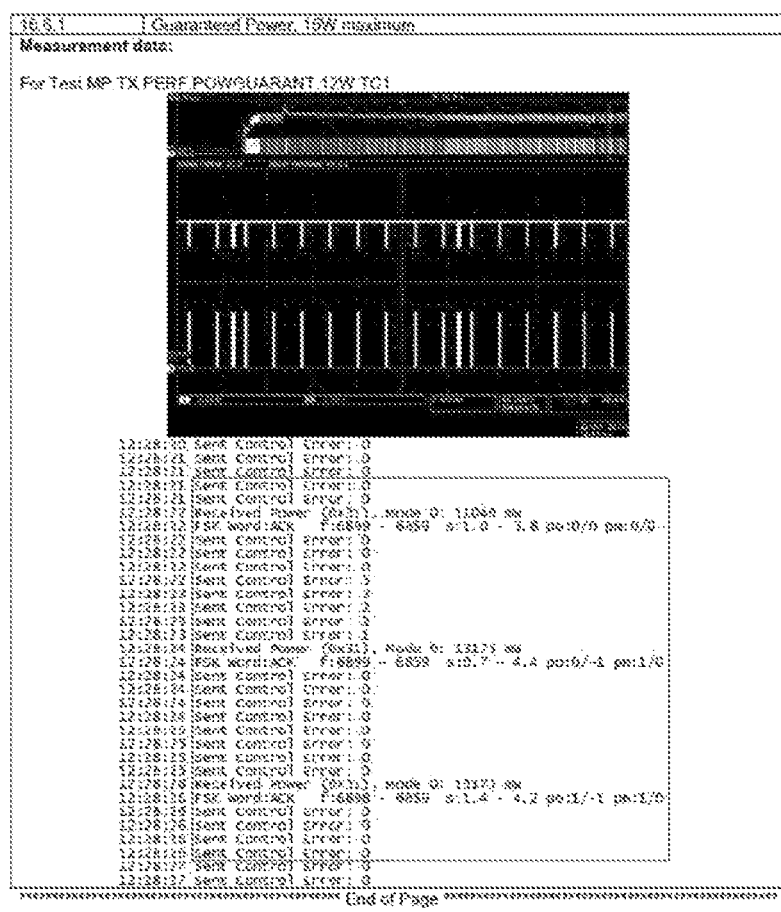
(a) 12W

[FIG. 11b]
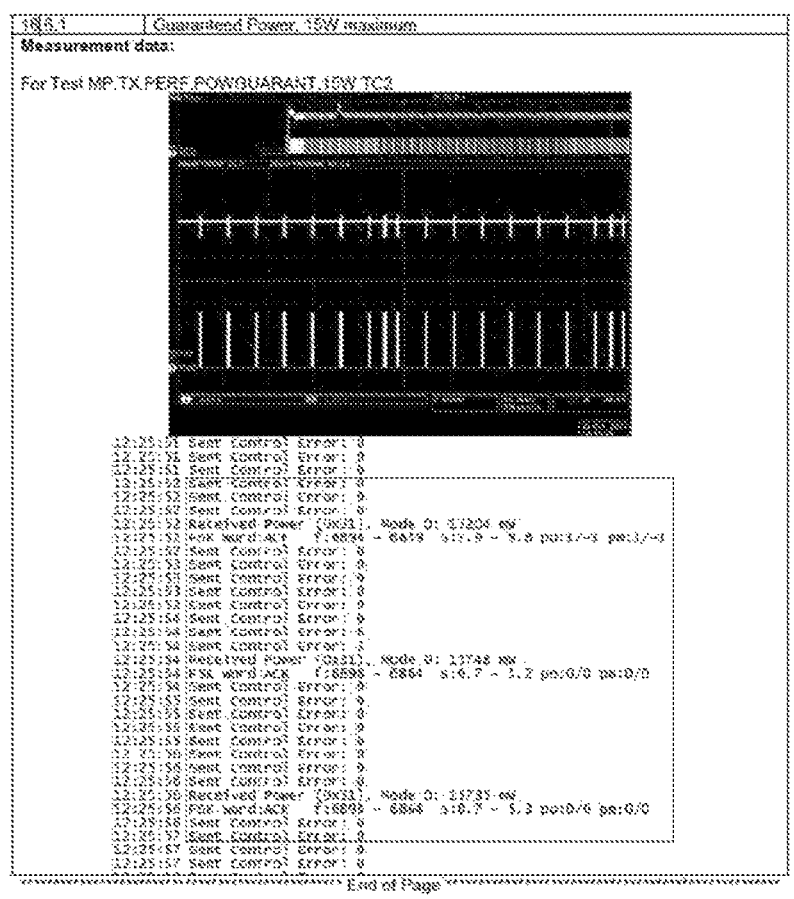
(b) 15W

[FIG. 12]

| | Distance | FO Temp. | Criteria |
|---|---|---|---|
| Test #25(a) | 0 mm | 45°C | ≤60°C |
| | 2 mm | 49°C | |
| | 5 mm | No charging | |
| Test #25(b) | 0 mm | 44°C | ≤60°C |
| | 2 mm | 48°C | |
| | 5 mm | No charging | |
| Test #25(c) | 0 mm | No charging | ≤60°C |
| | 2 mm | No charging | |
| | 5 mm | No charging | |
| Test #25(d) | 0 mm | No charging | ≤80°C |
| | 2 mm | No charging | |
| | 5 mm | No charging | |

Test Result: (Pass) / Fail

[FIG. 13]
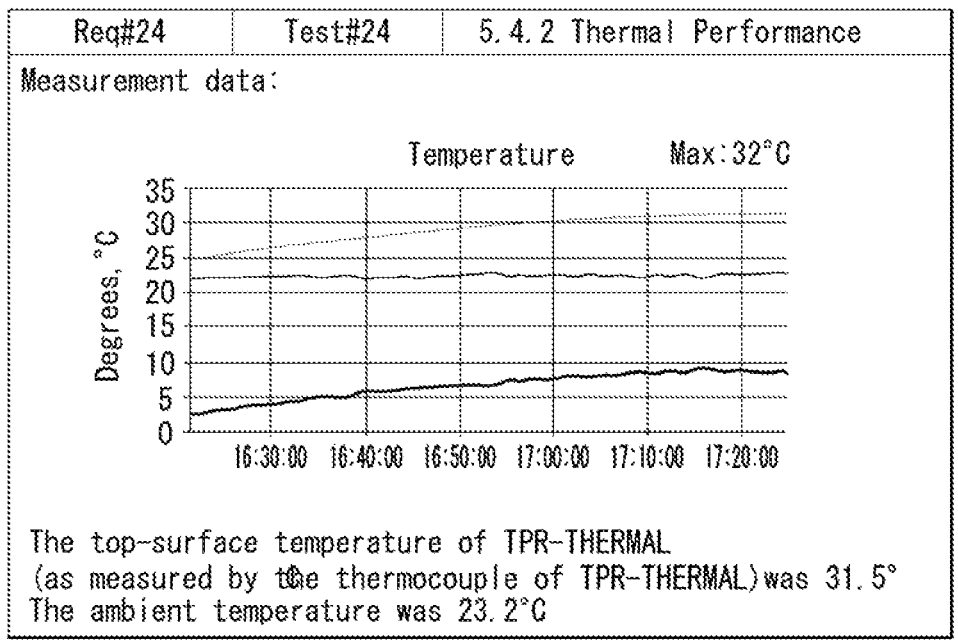
[FIG. 14]
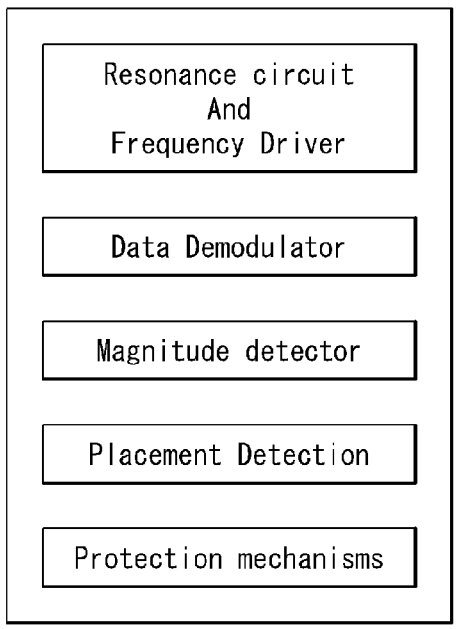

[FIG. 15]
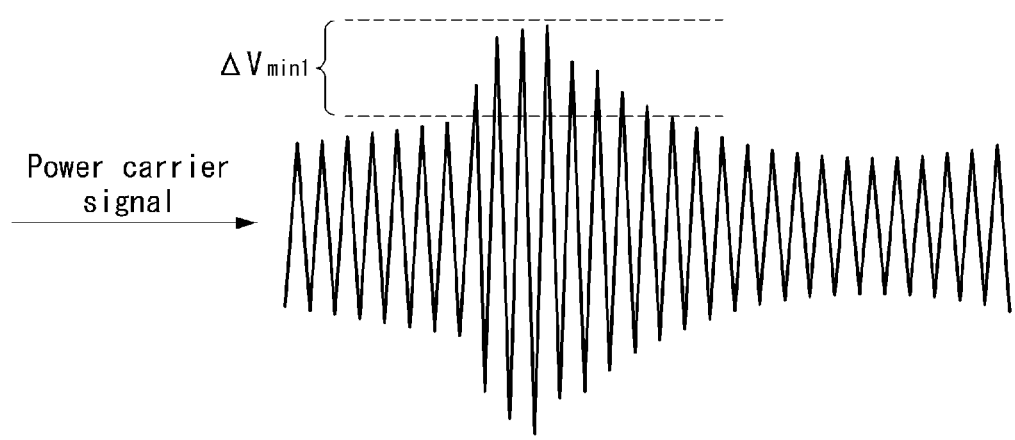

[FIG. 16]
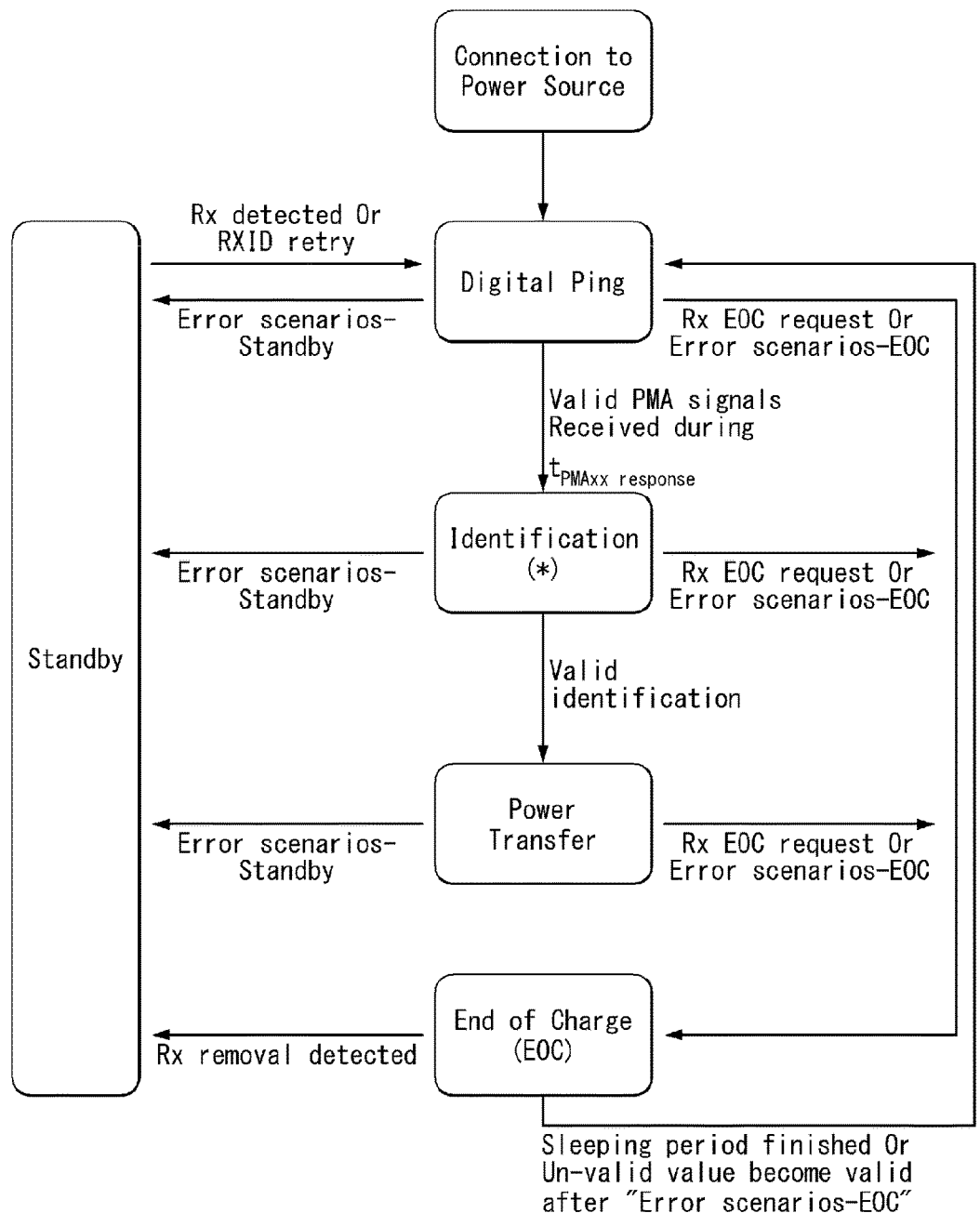

[FIG. 17]
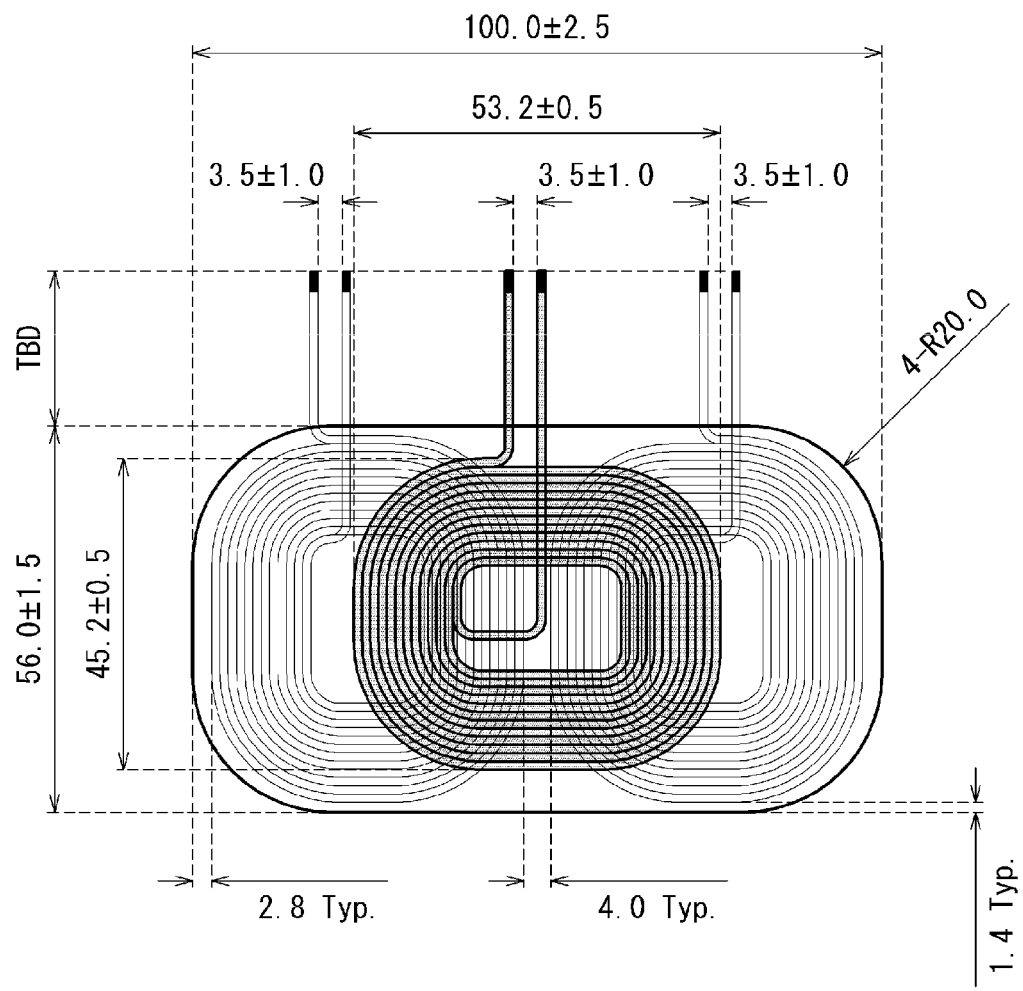

[FIG. 18]
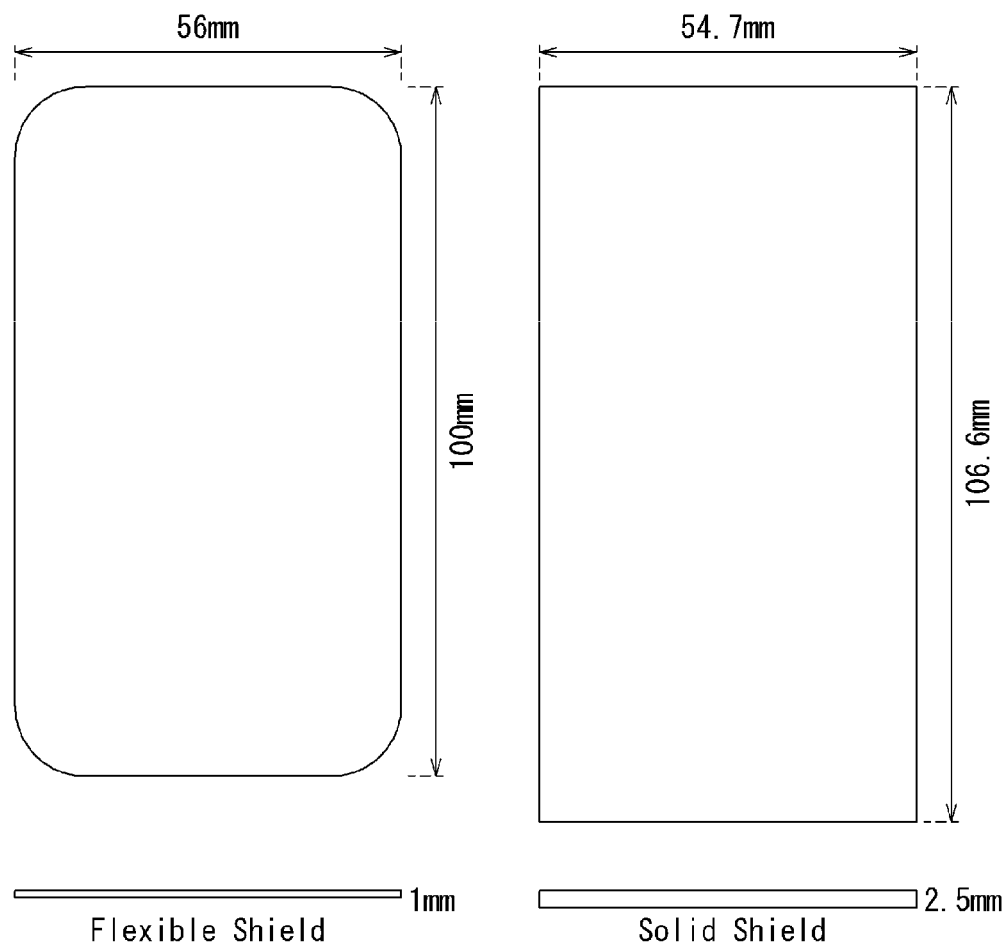

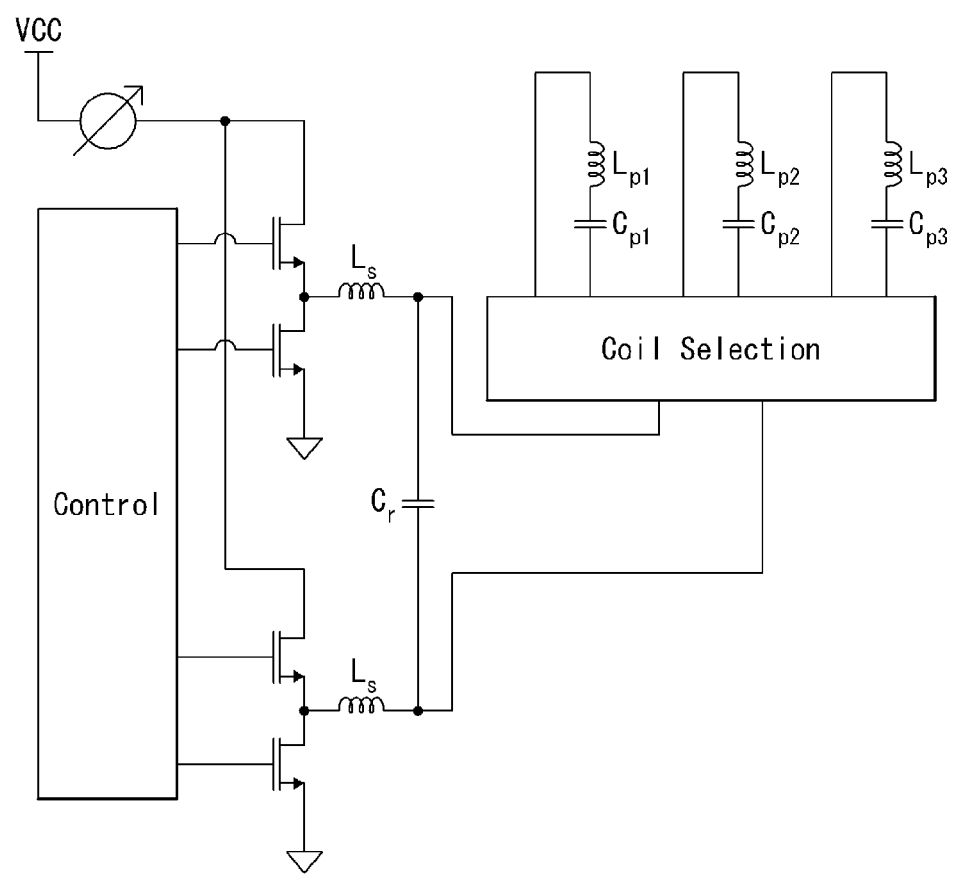
[FIG. 19]

[FIG. 20]
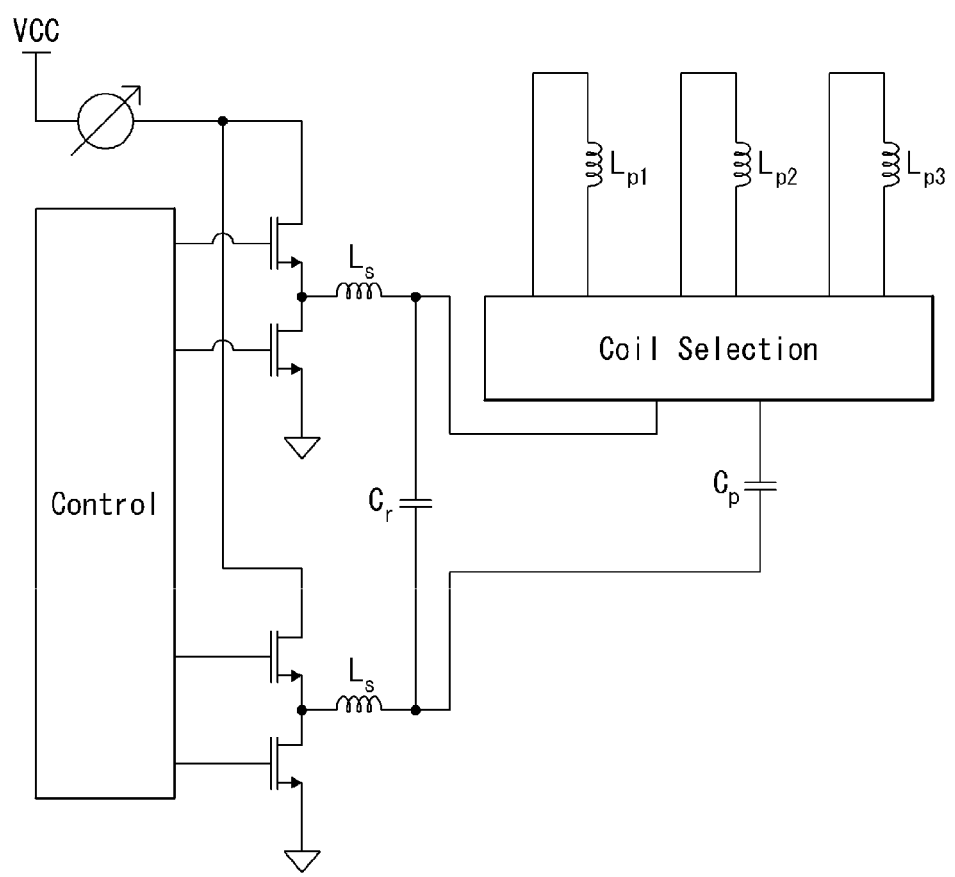

[FIG. 21]
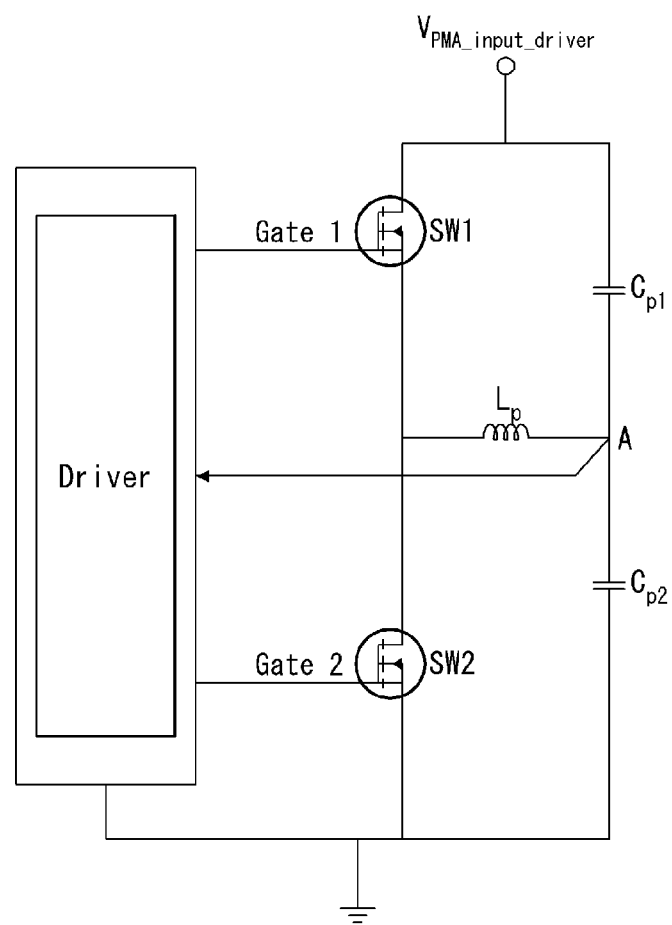

[FIG. 22]
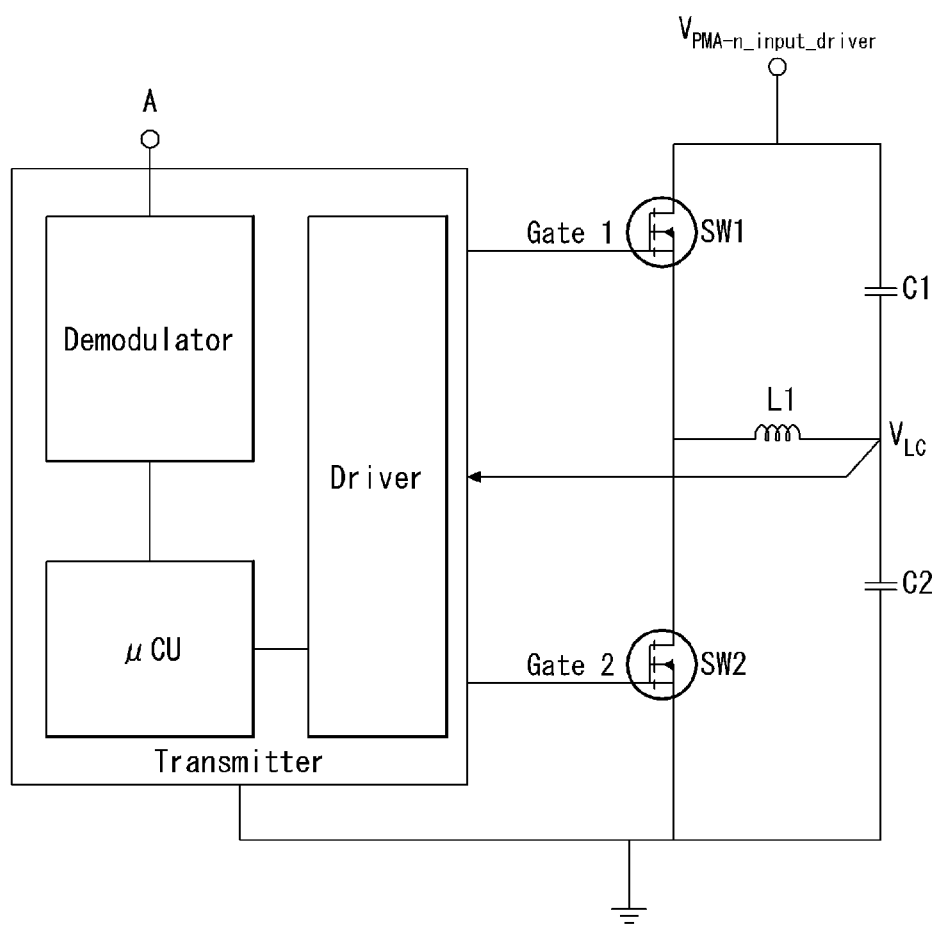

[FIG. 23]
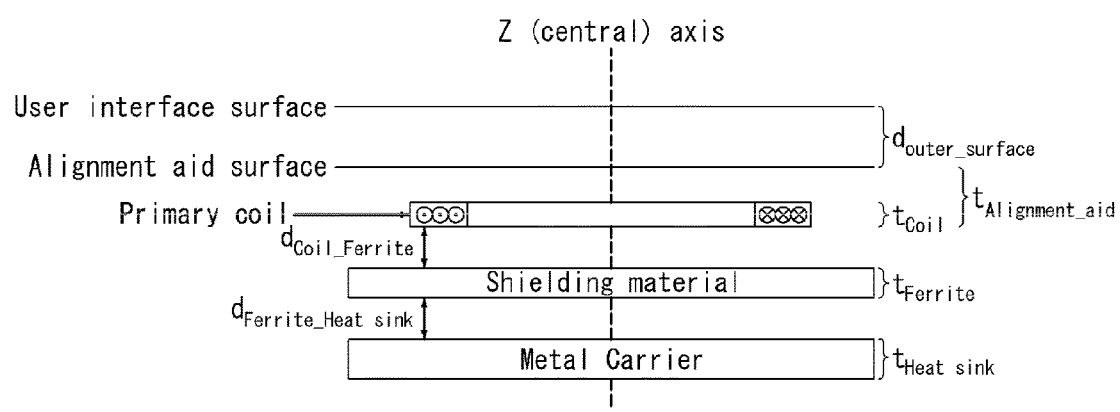

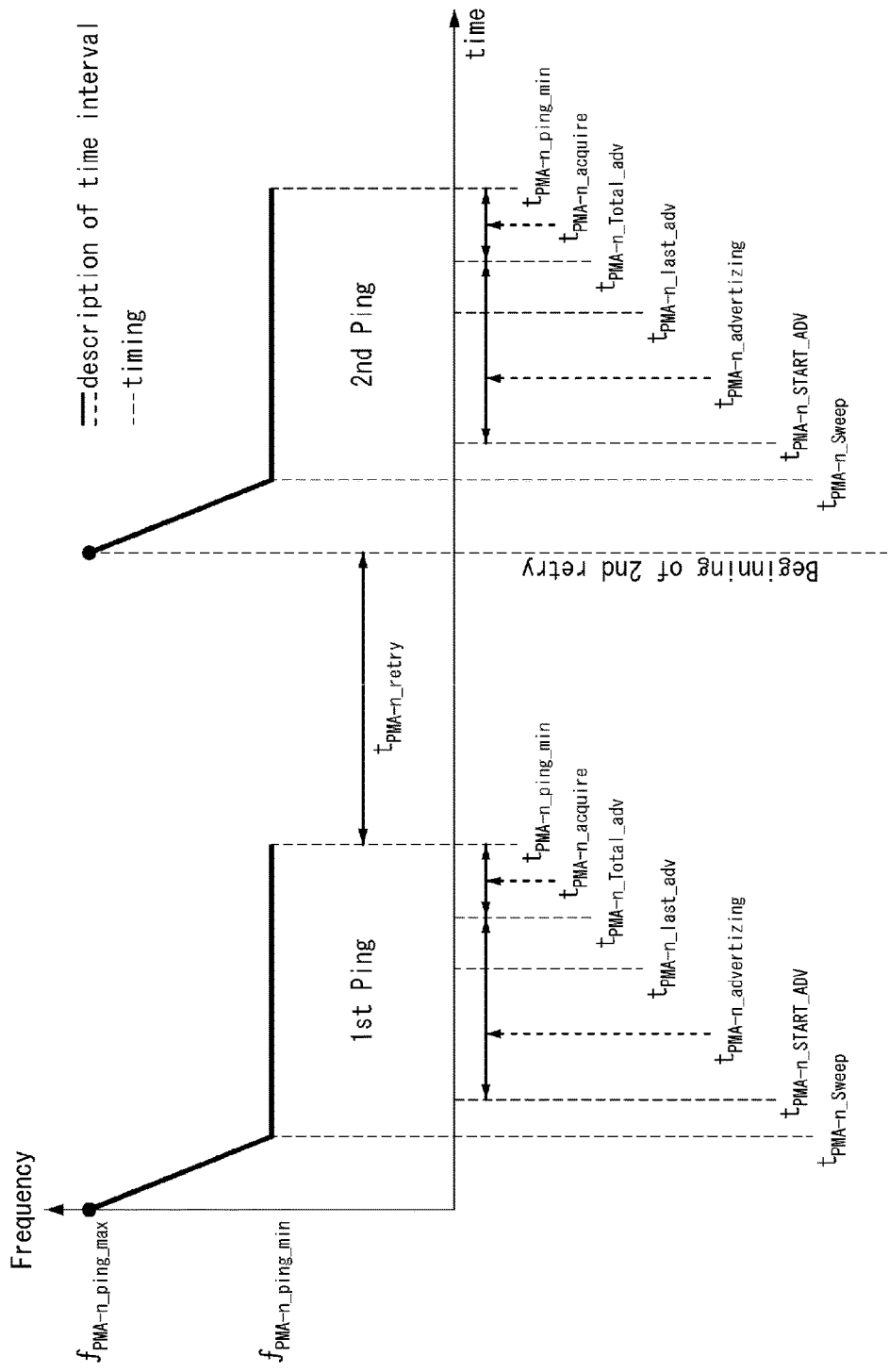
[FIG. 24]

[FIG. 25]

| MSB 4 | MSB 3 | MSB 2 | MSB 1 | MSB 0 | LSB 2 | LSB 1 | LSB 0 | CRC 3 | CRC 2 | CRC 1 | CRC 0 |
|---|---|---|---|---|---|---|---|---|---|---|---|
| 0 | 0 | 0 | 1 | 1 | 1 | 0 | S | 1 | 0 | 1 | 1 |

5 MSBs Type code    3 LSBs Capability code    CRC code

WIRELESS POWER TRANSMITTER AND RECEIVER FOR VEHICLE

CROSS-REFERENCE TO RELATED APPLICATIONS

This application is a Continuation-in-Part of copending application Ser. No. 15/541,180, filed on Jun. 30, 2017, which is the National Phase of PCT International Application No. PCT/KR2016/012682, filed on Nov. 4, 2016, which claims priority under 35 U.S.C. 119(e) to U.S. Provisional Application No. 62/251,118, filed on Nov. 5, 2015, all of which are hereby expressly incorporated by reference into the present application.

TECHNICAL FIELD

The present invention relates to a structure for a wireless power transmitter and receiver for a vehicle and a method for controlling the same.

BACKGROUND ART

A contactless wireless charging method is an energy transfer method for electromagnetically transferring energy without using a wire in a method for sending energy through an existing wire so that the energy is used as power for an electronic device. The contactless wireless transmission method includes an electromagnetic induction method and a resonant method. In the electromagnetic induction method, a power transmission unit generates a magnetic field through a power transmission coil (i.e., a primary coil), and a power reception coil (i.e., a secondary coil) is placed at the location where an electric current may be induced so that power is transferred. In the resonant method, energy is transmitted using a resonant phenomenon between the transmission coil and the reception coil. In this case, a system is configured so that the primary coil and the secondary coil have the same resonant frequency, and resonant mode energy coupling between the transmission and reception coils is used.

DISCLOSURE

Technical Problem

The present invention provides a novel coil assembly structure for a wireless power transmitter for a vehicle that has good charging efficiency/performance, and a method of operating such a wireless power transmitter for a vehicle.

Technical Solution

An embodiment of the present invention provides a wireless power transmitter for a vehicle that transfers power to a wireless power receiver, comprising: a resonance circuit comprising a coil assembly and/or a capacitor, wherein the coil assembly comprises first and second bottom coils placed adjacent to each other in a line and each consisting of a single layer of 11 turns and a top coil stacked on the first and second bottom coils and consisting of a single layer of 12 turns; a frequency full bridge driver driving each of coils included in the coil assembly individually, and a placement detection unit detecting a placement of the wireless power receiver, wherein the first and second bottom coils and the top coil have a substantially rectangular frame structure with a through hole in the center, wherein the top coil lies on a plane surface in the middle between the first and second bottom coils, wherein an area of the top coil is 49.5±1.0 mm×46.0±1.0 mm, and an area of the through hole in the top coil is 21.0±1.0 mm×25.5±1.0 mm, and wherein an area of the first and second bottom coils is 49.0±1.0 mm×44.0±1.0 mm and an area of the through hole in the first and second bottom coils is 26.0±1.0 mm×22.0±1.0 mm.

Also, the first and second bottom coils and the top coil have a same inductance value.

Also, the first and second bottom coils and the top coil have the same inductance value within a range of 10.6 µH to 12.0 µH.

Also, the capacitor has a capacitance value of 126.5 nF to 139.5 nF.

Also, a level of power transferred to the wireless power receiver is controlled based on a level of input voltage and/or input current applied to the frequency full bridge driver.

Also, the level of input voltage applied to the frequency full bridge driver is adjusted within a range of 2.5 V to 15 V.

Also, the level of input current applied to the frequency full bridge driver is adjusted within a range of 1 V to 1.5 V.

Also, an operating frequency of the placement detection unit is 130±5 kHz, and a duty cycle of the placement detection unit is 50±5%.

Also, when the placement detection unit transmits a digital ping signal to wake up the wireless power receiver, a maximum frequency of the digital ping is 145±5 kHz.

Also, an operating frequency of the resonance circuit is adjusted within a range of 140 kHz to 150 kHz.

Also, the number of the first and second bottom coils is 11 and the number of the top coil is 12.

Technical Effects

According to an embodiment of the present invention, the application of a multi-coil driving scheme to a coil assembly widens the chargeable area but minimizes the unchargeable area, thereby increasing the charging performance/efficiency.

Also, according to an embodiment of the present invention, it is possible to prevent frequency interference with other electronic parts/equipment within the vehicle as the power transmitter operates at a fixed operating frequency.

Also, according to an embodiment of the present invention, the power transmitter has a very wide adjustable input voltage range of 1 V to 18 V, and supports high input voltage, thus increasing the z distance d_z and enabling long-distance charging. This gives vehicle manufacturers a greater degree of freedom in the installation of a power transmitter in a vehicle.

Other advantages of embodiments of the present invention will be described below in detail.

BRIEF DESCRIPTION OF THE DRAWINGS

FIG. 1 shows an embodiment of various electronic devices into which a wireless charging system is introduced.

FIG. 2 is a block diagram of a wireless power transmission/reception system in accordance with an embodiment of the present invention.

FIG. 3 is a block diagram of a power transmitter in accordance with an embodiment of the present invention.

FIG. 4 is a diagram illustrating a coil assembly structure for a power transmitter in accordance with an embodiment of the present invention.

FIG. 5 illustrates a coil structure in accordance with an embodiment of the present invention.

FIG. 6 is a diagram illustrating a shielding structure that covers a coil assembly in accordance with an embodiment of the present invention.

FIG. 7 is a diagram illustrating an equivalent circuit of a power transmitter in accordance with an embodiment of the present invention.

FIGS. 8a, 8b and 9 show test results of the power transfer performance of a power transmitter designed in accordance with an embodiment of the present invention.

FIGS. 10a, 10b, 11a, and 11b show test results of the transmit power level adjustment function of a power transmitter designed in accordance with an embodiment of the present invention.

FIGS. 12 and 13 show test results of the thermal performance of a power transmitter designed in accordance with an embodiment of the present invention.

FIG. 14 illustrates the high-level interface blocks of the Tx design.

FIG. 15 shows a Positive Modulation Depth illustration.

FIG. 16 illustrates control phases in the Tx perspective.

FIG. 17 is an exemplary of mechanical structure of the primary coil of the PMA-6 Tx.

FIG. 18 is a diagram illustrating an example of a shielding material of a PMA-6 Tx in accordance with an embodiment of the present invention.

FIGS. 19 and 20 describe a resonant circuit for the PMA-6 Tx and PMA-6b Tx Types respectively.

FIG. 21 illustrates an example of a frequency full bridge driver of a resonant circuit shown in FIGS. 19 and 20.

FIG. 22 is a diagram illustrating an example of a Tx detection/Tx coil sense circuit included in a placement detection unit in accordance with an embodiment of the present invention.

FIG. 23 is a diagram illustrating an exemplary side view of a PMA-6/6b Tx in accordance with an embodiment of the present invention.

FIG. 24 is a diagram illustrating an example of a Tx digital ping operation in a digital ping phase in accordance with an embodiment of the present invention.

FIG. 25 illustrates an advertising example of a PMA 6/6b Tx type.

BEST MODE FOR INVENTION

Terms used in this specification are common terms which are now widely used by taking into consideration functions in this specification, but the terms may be changed depending on an intention of those skilled in the art, a use practice, or the appearance of a new technology. Furthermore, in a specific case, some terms have been randomly selected by the applicant. In this case, the meaning of a corresponding term is described in a corresponding part of a corresponding embodiment. Accordingly, the terms used in this specification should not be understood simply based on their names, but should be understood based on their substantial meanings and contents over this specification.

Furthermore, although embodiments of the present invention are described in detail with reference to the accompanying drawings and contents described in the drawings, the present invention is not limited to or restricted by the embodiments.

Hereinafter, some embodiments of the present invention are described in detail with reference to the accompanying drawings.

For the standardization of wireless power transmitter/receivers, Wireless Power Consortium (WPC) standardizes technologies related to wireless power transmission/reception.

A recently developed wireless charging system may support the transmission/reception of low power of about 5 W. In this case, there is a problem in that a charging time is long and efficiency is low in such a low power charging method because the size of a mobile device and the capacity of a battery are recently increased. Accordingly, a wireless charging system supporting the transmission/reception of middle power of about 15 W~20 W is developed. Furthermore, in order to improve charging efficiency, a wireless charging system to which a resonant method for simultaneously charging a plurality of electronic devices has been added is developed.

An embodiment of the present invention relates to a wireless charging system to which the resonant method has been added and proposes a wireless charging transmitter/receiver using the resonant method, which is compatible with a wireless charging transmitter/receiver using an electromagnetic induction method supporting low power/middle power.

A wireless power transmitter and wireless power receiver of a resonant type proposed by an embodiment of the present invention and a wireless charging method and a communication protocol using the wireless power transmitter and wireless power receiver are described below. Furthermore, a wireless power transmitter may be abbreviated as a power transmitter or a transmitter, and a wireless power receiver may be abbreviated as a power receiver or a receiver.

FIG. 1 shows an embodiment of various electronic devices into which a wireless charging system is introduced.

FIG. 1 shows that electronic devices are classified depending on an amount of power that is transmitted and received in a wireless charging system.

Referring to FIG. 1, a small power (about 5 W or less or about 20 W or less) wireless charging method may be applied to wearable devices, such as a smart watch, smart glass, a head mounted display (HMD), and a smart ring, and mobile electronic devices (or portable electronic devices), such as an earphone, a remote controller, a smart phone, a PDA, and a tablet PC. A middle power (about 50 W or less or about 200 W or less) wireless charging method may be applied to middle/small-sized home appliances, such as a notebook computer, a robot clearer, a TV, an audio equipment, a vacuum and a monitor. A large power (about 2 kW or less or 22 kW or less) wireless charging method may be applied to kitchen equipment, such as a mixer, a microwave, and an electric rice cooker, and personal mobile devices (or electronic devices/mobile means), such as a wheel chair, an electric kickboard, an electric bicycle, and an electric vehicle.

Each of the aforementioned electronic devices/mobile means (or shown in FIG. 1) may include a wireless power receiver to be described later. Accordingly, the aforementioned electronic devices/mobile means may be wirelessly charged with power received from a wireless power transmitter.

Hereinafter, a mobile device to which the small wireless charging method is applied is chiefly described for convenience of description, but this is only an embodiment. A wireless charging method in accordance with an embodiment of the present invention may be applied to the aforementioned various electronic devices.

FIG. 2 is a block diagram of a wireless power transmission/reception system in accordance with an embodiment of the present invention.

Referring to FIG. 2, a wireless power transmission/reception system 2000 includes a mobile device 2010 configured to wirelessly receive power and a base station 2020 configured to wirelessly transfer (or transmit) power. Hereinafter, the mobile device may also be called a "power receiver product", and the base station may also be called a "power transmitter product."

The mobile device 2010 includes a power receiver 2011 for wirelessly receiving power through a secondary coil and a load 2012 for receiving power received by the power receiver 2011, storing the received power, and supplying the stored power to a device.

The power receiver 2011 may include a power pick-up unit 2013 and a communications & control unit 2014. The power pick-up unit 2013 may receive a wireless power signal through the secondary coil and convert the received signal into electric energy. The communications & control unit 2014 may control the transmission/reception of a power signal (or power).

The base station 2020 is a device for providing inductive power or resonant power, and may include at least one power transmitter 2021 or a system unit 2024.

The power transmitter 2021 may send inductive power or resonant power and control such transmission. The power transmitter 2021 may include a power conversion unit 2022 configured to convert electric energy into a power signal by generating a magnetic field through a primary coil(s) and a communications & control unit 2023 configured to control communication and power transfer with the power receiver 2011 so that power of a proper level is transferred. The system unit 2024 may perform control of other operations of the base station 2020, such as input power provisioning, control of a plurality of power transmitters, and control of a user interface.

The power transmitter 2021 may control transmission power by controlling an operating point. The controlled operating point may correspond to a combination of a frequency (or phase), a duty cycle, a duty ratio, and voltage amplitude. The power transmitter 2021 may control transmission power by controlling at least one of a frequency (or phase), a duty cycle, a duty ratio, or voltage amplitude.

Furthermore, the power transmitter 2021 may supply constant power, and the power receiver 2011 may control reception power by controlling a resonant frequency.

In this specification, a (primary/secondary) coil or a coil unit may also be called a coil assembly, a coil cell, or a cell which includes a coil and at least one element close to the coil.

FIG. 3 is a block diagram of a power transmitter in accordance with an embodiment of the present invention.

Referring to FIG. 3, the power transmitter 3000 may include two main units: a power conversion unit 3020 and a communications & control unit 3010. The power conversion unit 3020 may perform communication with the communications & control unit 3010.

The power conversion unit 3020 may be in charge of/include the analog part of a power transmitter design. The power conversion unit 3020 may include an inverter, a primary coil selection block, and/or a current sense unit. The power conversion unit 3020 (or inverter) may receive DC (direct current) input and convert it to an AC waveform for operating a resonant circuit including a series capacitor and a primary coil(s). Here, the primary coil may refer to a coil that is appropriately selected from among at least one coil in the power transmitter depending on the location of the power receiver, in order to charge the power receiver.

The power conversion unit 3020 (or coil selection block) may select at least one coil in a proper position to charge the power receiver, from among the coils included in a coil assembly, depending on the location of the power receiver placed on the coil assembly.

Coil selection may be done/performed in real time by the power transmitter 3000 (or power conversion unit 3020/coil selection block) by performing/attempting communication with the power receiver using at least one coil included in the coil assembly (or all the coils in sequence). That is, the power transmitter 3000 (or power conversion unit 3020/coil selection block) may find the location of the power receiver by performing communication with the power receiver using at least one coil, and may select one coil corresponding to the location of the power receiver, For example, the power transmitter 3000 (or power conversion unit 3020/coil selection block) may attempt communication with the power receiver using at least one coil included in the coil assembly, and it can be assumed that an attempt to communicate with the power receiver using the first coil among them has succeeded. In this case, the power transmitter 3000 (or power conversion unit 3020/coil selection block) may determine/predict that the power receiver is currently placed on the first coil (or closest to the first coil), and may select the first coil as a coil to be driven for charging the power receiver.

Alternatively, although not shown in the drawing, the power transmitter 3000 may have a separate sensor (e.g., a proximity sensor, infrared sensor, etc.) for finding the location of the power receiver. In this case, the power transmitter 3000 may find the location of the power receiver by using the corresponding sensor, and may select a coil in a proper position to charge the power receiver as a drive coil.

Lastly, the power conversion unit 3020 (or current sense unit) may continuously monitor the current flowing through a selected coil.

The communications & control unit 3010 may be in charge of/include the digital logic part of a power transmitter design including a coil assembly.

More specifically, the communications & control unit 3010 may receive and decode a message from the power receiver, constitute a coil selection block to connect with a proper coil, and execute a power control algorithm/protocol related to the coil selection block. Moreover, the communications & control unit 3010 may control/drive the frequency of an AC waveform for controlling power transfer. In addition, the communications & control unit 3010 may interface with other subsystems of the base station (for the purpose of user interfacing, for example).

Although this block diagram shows and describes the power conversion unit 3000 and the communications & control unit 3010 separately, the present invention is not limited to this and at least one of the functions of the power conversion unit 3000 may be performed by the communications & control unit 3010 or at least one of the functions of the communications & control unit 3010 may be performed by the power conversion unit 3000. Furthermore, the power conversion unit 3000 and the communications & control unit 3010 may be configured as separate chips or built into one chip.

So far, the block diagram of the power transmitter 3000 in accordance with an embodiment of the present invention has been described. Below is a description of a coil assembly structure that may be included in the power transmitter 3000.

FIG. 4 is a diagram illustrating a coil assembly structure for a power transmitter in accordance with an embodiment of the present invention.

Referring to FIG. 4, the coil assembly for a power transmitter in accordance with an embodiment of the present invention may include three coils. Each of the three coils may have a substantially rectangular frame structure with a through hole in the center.

The coil assembly may include two bottom coils (or referred to as "bottom primary coils") arrayed and placed in a line and a top coil (or referred to as "top primary coil") placed on (or over) the bottom coils. In other words, the coil assembly may have a stack structure of a plurality of coils stacked on a plane surface to overlap, with the bottom coils being arranged on a first layer, and the top coil being stacked on the first layer.

If one of the two bottom coils included in the coil assembly is referred to as a first bottom coil and the other as a second bottom coil, the distance d_12 from the center of the first bottom coil to the center of the second bottom coil may be about 46±4 mm. The top coil may be placed orthogonal to the bottom coils, and may lie in the middle between the two bottom coils arrayed in a line. The distance d_bt from the center of the first and/or second bottom coil to the center of the top coil may be about 23±2 mm. Although not shown in this drawing, the distance d_z from the top surface of the coil assembly (or the top surface of the top coil) to the interface surface of the base station may be about 5.5±1.5 mm. Here, the interface surface may refer to a flat surface closest to the primary coils, among a plurality of surfaces constituting the base station, or refer to a flat surface closest to the secondary coil, among the surfaces of the mobile device. The self inductance L_p of each coil (or primary coil) may be about 11.3±0.7 µH.

The following is a more detailed description of a structure of each of the coils (or primary coils—i.e., the bottom coils and the top coil) constituting the coil assembly proposed in this specification.

FIG. 5 illustrates a coil structure in accordance with an embodiment of the present invention. Specifically, FIG. 5(a) is a diagram illustrating a bottom coil structure, and FIG. 5(b) is a diagram illustrating a top coil structure. Hereinafter (or in this specification), the bottom coil and the top coil will be commonly referred to as "primary coils" for convenience of explanation.

The primary coils may be wire-wound type, and may consist of a 17 AWG (American wire gauge) litz wire made from 105 strands of 40 AWG wire (0.08 mm in diameter), or a litz wire of similar type or structure. As previously described, the primary coils may include two types of rectangular coils (bottom coil and top coil), and each coil may consist of a single layer. Each primary coil may be designed to have the same inductance value so as to be independent from the distance from ferrite.

The bottom coil may be placed close to the ferrite in the power transmitter, and the bottom coil may have specific parameter values as presented in the table shown in FIG. 5(a).

Referring to the table shown in (a) of FIG. 5, the bottom coil may be designed to have an outer length (or outer height) d_ol of about 49.0±1.0 mm, an inner length (or inner height) d_il of about 26.0±1.0 mm (or about 19.0±1.0 mm), an outer width d_ow of about 44.0±1.0 mm (or about 48.0±1.0 mm), an inner width d_iw of about 22.0±1.0 mm (or about 19.0±1.0 mm), and a thickness d_c of about 1.1±0.2 mm. The bottom coil may be designed to have a single-layer structure, and the number N of turns per layer in the bottom coil may be 11.

The top coil may be placed close to the interface of the power transmitter, and the top coil may have specific parameter values as presented in the table shown in FIG. 5(b).

Referring to the table shown in FIG. 5(b), the top coil may be designed to have an outer length (or outer height) d_ol of about 46.0±1.0 mm, an inner length (or inner height) d_il of about 21.0±1.0 mm, an outer width d_ow of about 49.5±1.0 mm, an inner width d_iw of about 25.5±1.0 mm, and a thickness d_c of about 1.1±0.2 mm. The top coil may be designed to have a single-layer structure, and the number N of turns per layer in the top coil may be 12.

FIG. 6 is a diagram illustrating a shielding structure that covers a coil assembly in accordance with an embodiment of the present invention.

Referring to FIG. 6, a soft magnetic material may protect and cover the base station from magnetic fields generated by the primary coils. The shielding may extend a minimum of 2 mm beyond the outer edges of the primary coils and be a minimum of 2 mm thick. The shielding may be provided below the primary coils and have a distance d_s of maximum 1.0 mm from the primary coils. The shielding may be made of manganese-zinc (MnZn) ferrite (e.g., PM12 of Todaisu).

The distance d_z (or z distance) from the top face of the primary coils to the interface surface of the base station may be about 1.1±0.2 mm. The interface surface of the base station may be designed to extend a minimum of 5 mm beyond the outer edges of the primary coils.

FIG. 7 is a diagram illustrating an equivalent circuit of a power transmitter in accordance with an embodiment of the present invention.

Referring to FIG. 7, the power transmitter (or coil assembly drive circuit) in accordance with an embodiment of the present invention may use/include a full-bridge inverter (hereinafter, abbreviated as "inverter") for driving individual primary coils and a series capacitor C_p. This full-bridge inverter concept may correspond to the above-described power conversion unit or be included in it.

The coil assembly and the shielding may be designed to have a magnetic inductance L_p of about 11.3±0.7 µH (i.e., 10.6~12.0 µH), and the series capacitor C_p may be designed to have a capacitance of about 139±6% µH (i.e., 133~147 nF).

The power transmitter (or communications & control unit) may control the input voltage applied to the inverter in order to control the amount of power transmitted to the power receiver. More particularly, the power transmitter (or communications & control unit) may control the input voltage applied to the inverter over the range of 1 V to 18 V, with a resolution of 10 mV. The inverter may operate in mid-power mode and low-power mode. The operating frequency f_op of the power transmitter (or coil assembly) may be substantially fixed at about 140 to 150 kHz, with a duty cycle of 50%. As used herein, the operating frequency may mean the oscillation frequency of a voltage/power signal applied to drive/operate the power transmitter (or coil assembly). An external voltage applied to the power transmitter may range from 10 V to 14 V (generally, 12 V).

In a case where the power transmitter (or communications & control unit) transmits/applies a power signal (e.g., digital ping signal), an initial voltage of about 5.0±0.5 V may be used to the bottom and top coils, and the operating frequency used may be in the range of 140 kHz to 150 kHz—for example, 145 kHz.

Control of the power transmitter (or communications & control unit) may be performed using a proportional integral differential (PID) algorithm. As used herein, the PID algorithm (or PID controller) denotes an algorithm that basically takes the form of a feedback controller, calculates an error value by measuring an output value of an object intended to be controlled and comparing the measured output value to a reference value or setpoint, and derives a control value required by using the error value.

To ensure accurate power control, the power transmitter (or communications & control unit) may determine the amplitude of primary cell current (same as primary coil current) with a resolution of about 7 mA.

Tables 1 and 2 below show parameter values that may be used in the TID algorithm.

TABLE 1

| Parameter | Symbol | Value | Unit |
|---|---|---|---|
| Proportional gain | Krp | 10 | $mA^{-1}$ |
| Integral gain | Kri | 1 | $mA^{-1}\,ms^{-1}$ |
| Derivative gain | Krd | 0 | $mA^{-1}\,ms$ |
| Integral term upper limit | Mriu | 3000 | N.A. |
| Integral term lower limit | Mril | −3000 | N.A. |
| PID output upper limit | Mrupid | 20000 | N.A. |
| PID output upper limit | Mrlpid | −20000 | N.A. |
| PID Scaling Factor | Krpid | 100 | N.A |

TABLE 2

| Parameter | Symbol | Value | Unit |
|---|---|---|---|
| Proportional gain | Kdp | 30 | $mA^{-1}$ |
| Integral gain | Kdi | 1 | $mA^{-1}\,ms^{-1}$ |
| Derivative gain | Kdd | 0 | $mA^{-1}\,ms$ |
| Integral term upper limit | Mdiu | 3000 | N.A. |
| Integral term lower limit | Mdil | −3000 | N.A. |
| PID output upper limit | Mdupid | 20000 | N.A. |
| PID output upper limit | Mdlpid | −20000 | N.A. |
| PID Scaling Factor | Kdpid | 15 | N.A |

With all of the above considered, the power transmitter (or a power transmitter circuit or the communications & control unit) in accordance with an exemplary embodiment of the present invention may control the power transferred to the power receiver by controlling the input voltage applied to the inverter. In this case, a substantially fixed operating frequency, adjustable only in the range of about 140 kHz to 150 kHz, may be used. The adjustable input voltage range is 1 V to 18 V, which is much wider than the range of input voltage applied to the inverter from other power transmitters. With this feature, the power transmitter of this invention has the following advantages and effects when used as a wireless power transmitter for a vehicle.

One of the advantages is that it is possible to prevent frequency interference with other electronic parts/equipment within the vehicle as the power transmitter operates at a fixed operating frequency. Frequency interference between the power transmitter and other electronic parts/equipment may cause safety issues critical for the driver's life and safety. Accordingly, unlike other general power transmitters, a power transmitter for a vehicle proposed in this invention may regulate the transferred power by controlling the input voltage instead of the operating frequency.

Another advantage is that the power transmitter has a very wide adjustable input voltage range of 1 V to 18 V, and supports high input voltage, thus increasing the z distance d_z and enabling long-distance charging. This gives vehicle manufacturers a greater degree of freedom in the installation of a power transmitter in a vehicle.

As such, the power transmitter designed as shown in FIGS. 4 to 7 may be made and used as a low-power transmitter for a vehicle that enables low-power charging at about 5 W or as a medium-power transmitter for a vehicle that enables wireless power charging at about 15 W.

Now, test results of the power transfer performance of the power transmitter designed as shown in FIGS. 4 to 7 will be discussed.

FIGS. 8a, 8b and 9 show test results of the power transfer performance of a power transmitter designed in accordance with an embodiment of the present invention.

In the test of FIGS. 8 and 9, the power transmitter transferred power to the power receiver, aiming at reaching six target voltage levels a~f, and actual measurements of the voltage received by the power receiver were made. The target voltage levels for power transfer to the power receiver were set as follows:

a: 4.2V, b: 7.0V, c: 4.2V, d: 7.5V, e: 5.0V, f: 5.0V

From the Guaranteed Power category of FIG. 8, it is demonstrated that the power transfer performance test results were pass for all the six target voltage levels a~f. More specifically, referring to FIGS. 9(a) to 9(f), it is demonstrated that power was transferred to the power receiver at appropriate voltage levels, without a large deviation from the target voltage levels.

Besides, referring to FIG. 8, it is demonstrated that the power transmitter of the invention satisfies all the power transmitter specifications defined by the WPC standard.

FIGS. 10a, 10b, 11a, and 11b show test results of the transmit power level adjustment function of a power transmitter designed in accordance with an embodiment of the present invention.

More specifically, FIG. 10(a), FIG. 10(b), FIG. 11(a), and FIG. 11(b) show test results of the transmit power level adjustment function of the power transmitter when the target power level is 8 W, 15 W, 12 W, and 15 W, respectively. In FIGS. 10 and 11, a "Sent Control Error: n" message indicates that the power currently received by the power receiver is n W less than the target transmit power.

Referring to the test results of FIGS. 10 and 11, the power transmitter of this invention may find out how far the current level of power being transferred to the power receiver falls below the target power level by performing communication with the power receiver, and based on this, may adjust the transmit power level to the target power level. That is, the test results of FIGS. 10 and 11 reveal that the power transmitter of this invention may adjust the transmit power level to the target power level by performing proper communication with the power receiver.

FIGS. 12 and 13 show test results of the thermal performance of a power transmitter designed in accordance with an embodiment of the present invention.

More specifically, FIG. 12 shows test results from measurements of temperature changes in a foreign object (FO) when a power transmitter designed in accordance with an embodiment of the present invention transfers low power (about 5 W) to the FO, rather than the power receiver. FIG. 13 shows test results from measurements of temperature changes in the power receiver when the power transmitter transfers low power to the power receiver.

Referring to FIG. 12, it is demonstrated that the FO temperature did not go up or it increased up to 49□. Referring to FIG. 13, it is demonstrated that the temperature of the power receiver increased up to 32□.

From these test results, it can be said that the power receiver or FO that receives power from the power transmitter does not rise above a specific temperature, and this allows the user to use the power transmitter of this invention without risk of explosion or fire.

In the above, a coil structure for a power transmitter has been proposed. In the following, a PMA-6b transmitter (Tx), which is a sub-type of a Power Matters Alliance (PMA)-6 Tx defined by AirFuel Alliance which is an organization for developing wireless power system standards, will be proposed as the aforementioned coil structure. Beforehand, take a look into the basic structure and scheme of a wireless power system defined by AirFuel Alliance, and the PMA-6 Px defined in the corresponding system. The coil structure of the PMA-6b Tx is the same as described above with reference to FIGS. 4 to 7, and thus, redundant description will be omitted.

General Tx Requirements in Airfuel Alliance System

FIG. 14 illustrates the high-level interface blocks of the Tx design.

The basic design of the AirFuel Inductive Tx (Transmitter) device consists of the following blocks which interface with an AirFuel Inductive compliant Rx (Receiver) device:

A resonance circuit that includes a primary coil and/or resonance capacitors.

Data demodulator which is used to extract the modulated data that is sent by the Rx.

Magnitude detector unit that monitors the primary coil voltage.

Placement Detection unit which is responsible for detecting a possible placement of a Rx on the surface of the Tx.

Protections mechanisms responsible for proper and safe operation of the Tx.

At least one of the aforementioned units may be selectively included in a Tx or removed therefrom, or may be implemented as a hardware component. In this case, at least two units may be implemented as a chip, or each unit may be implemented as a chip.

1. Resonance Circuit and Frequency Driver

The serial resonance circuit is the main interface at the physical layer of the Tx design. The circuit is responsible for the power transfer between the Tx and the Rx.

The circuit is activated by a half or full bridge circuit, and complies with the following requirements:

Operational range—The Tx will operate in a defined frequency range. The range is specified by f_op_min and f_op_max and shall be greater than the circuit's self-resonance frequency (f_res), which can be calculated using the following equation:

Equation 1

$$f\_res = 1/(2\pi\sqrt{(Lp*Cp)})$$

Where Lp and Cp are the inductance and capacitance values of the resonance circuit respectively. Values are Tx type specific.

The frequency response curve of the resonance circuit shall be a monotonically decreasing function (i.e., at f_op_min, a maximum energy is transmitted to the Rx and as long as the Tx increases the operating frequency the transmitted power to the Rx shall decrease). The upper limit of the operational frequency range is defined by f_op_max. These values are Tx type specific and will be detailed in table 10 with respect to PMA-6/6b Tx type.

2. Data Modulator

An AirFuel Inductive compliant Rx uses a resistive or capacitive load modulation method for implementing the communication protocol between the Rx and the Tx. These load changes on the Rx coil are reflected on the Tx primary coil.

FIG. 15 shows a Positive Modulation Depth illustration.

The data demodulator shall be able to detect a "positive" voltage peak as described in FIG. 15, also called Mod state. The demodulator shall detect Mod state with a "positive" modulation depth of at least $\Delta V\_min1$ on the voltage signal of the Tx power carrier. The frequency of the described above peaks appearance shall be interpreted by the Tx and classified to one of the AirFuel Inductive communication protocol signals as described in the encoding scheme. The signals shall be detected with a tolerance of $\Delta F\_\%$ min percent on the signals designated frequency.

Tx types following PMA-6/6b shall use a more robust demodulation circuit. They shall be able to detect negative and positive modulation depth of at least $\Delta V\_min2$ and phase changes of $\Delta \theta\_min$ between the V_LC primary coil voltage signal and the frequency driver operational voltage signal describes the constraints regarding demodulation.

The above detection threshold are to be met by the Tx when the amplitude noise present on a filtered carrier signal does not exceed 50% of $\Delta V$ for amplitude detection, and the phase noise present on the filtered carrier signal does not exceed 50% of $\Delta \theta$ for phase demodulation. The filtering is applied as a BPF with cut-off frequencies of 4 kHz and 100 kHz. The above requirements will apply to amplitude noise level up to 10 V and 15 Deg respectively as long as the above conditions are met.

Spurious emissions from Tx device shall not exceed 0.1 V on the frequency band of 200 Hz-10 kHz around the power carrier as measured on the primary coil (V_LC).

The frequency of the described above peaks appearance shall be interpreted by the Tx and classified to one of the AirFuel Inductive communication protocol signals as described in the encoding scheme. The signals shall be detected with a tolerance of $\Delta F\_\%$ min percent on the signals designated frequency.

3. Magnitude Detector

All AirFuel Inductive Tx devices shall implement a unit that can monitor the primary coil voltage. The primary coil operational values are specific per Tx type.

4. Placement Detection

During the Standby phase, the Tx shall monitor its surface for a possible Rx placement. If an Rx is placed on the charging surface, the Tx shall detect the presence of the Rx and move to the Digital Ping phase. The Rx placement on the charging surface can be detected by the Tx in one or more of the following approved methods.

Monitor the change in the magnetic field (not recommended as single detection methods for new Tx designs).

Monitor changes in the overall inductance of the system (recommended for all new designs).

During the End of Charge (EOP) phase, the detection unit shall monitor the surface and detect if the Rx removed from the surface. In such case of Rx removal detection, the Tx shall move to the Standby phase.

The Tx should ensure the Rx is statically placed on the Tx and that it is not in the process of placement. This can be achieved by repeating the measurement made by the detection unit. The additional measurement can be done during the t_SB2DP period.

A Tx digital ping signal (minimum voltage on digital ping) shall be able to wake up any certified AirFuel Inductive Rx. Adherence to this requirement shall be verified by placing a reference RX1 at maximum offset defined for the Tx and allowing the Tx to ping it. The V_rect of the RX1 is measured and verified to reach V_rect>4V during the digital ping process.

A Tx digital ping signal (maximum voltage on digital ping) shall not create voltage spikes that may harm any certified AirFuel Inductive Rx. Adherence to this requirement shall be verified by placing a reference RX2 at full alignment with a tester Tx, and allow the Tx to ping it. The V_rect of the RX2 is measured and verified to be V_rect<15V during the entire digital ping process.

5. Protection Mechanisms

The details and requirements for the protection circuit are Tx type specific. For example, the PMA-6/6b Tx shall include protection mechanisms for over voltage, over temperature, over decrement, and over current occurrences.

FIG. 16 illustrates control phases in the Tx perspective.

1. Standby Phase

During all time of the Standby phase, the Tx shall monitor its surface to detect a possible Rx placement. The surface monitoring shall be done by using the Tx detection unit as described in the Placement Detection Unit section for each Tx type. To detect a possible placement of an Rx, the detection unit can use one or a combination of the approved methods.

2. Digital Ping Phase

The purpose of this phase is to engage with a possible Rx and to identify that it is a valid AirFuel Inductive Rx. To engage with a possible Rx, the Tx shall generate a Digital Ping signal with a predefined structure of frequencies and timings as described in Digital Ping section for the specific Tx type. If sufficient power is delivered to the Rx by the generated digital ping, the Rx will respond by modulating the power signal according to the AirFuel Inductive communication protocol.

If the Tx receives a valid response (the specific response is defined for each Tx type) from the Rx, it shall continue to the Identification phase without removing the power signal.

3. Identification Phase

Each AirFuel Inductive compliant Rx has a unique MACID (Media Access Control ID) called RXID. During the identification phase the Rx sends its RXID data and the Tx is required to identify the RXID and verify it is a fully compliant AirFuel Inductive device.

4. Power Transfer Phase

During the Power Transfer phase, the Tx shall provide a sufficient power to the Rx by changing its primary coil current according to the control data received from the Rx.

5. End of Charge Phase (EOP)

During the EOP phase, no power signal is transferred to the Rx. As such, for being able to detect Rx presence or removal, the Tx shall monitor its surface by using the placement detection unit. During the Power Transfer or Identification phases, Rx removal will cause Over Decrement, Data Loss or other abnormal operational conditions that may be used for detection of removal.

PMA-6/6b Type Tx

PMA-6 is a multi-coil EP (Extended Power($\geq$5 W)) Tx. The design of PMA-6 Tx is three-coil architecture, but the PMA-6 Tx is capable of driving a larger or smaller number of coils, depending on an embodiment. PMA-6 Tx is a fixed-frequency Tx for use in applications where EMI (electromagnetic induction) is a concern. There are some sub-types to the PMA-6 Tx. For example, there may be a PMA-6b Tx which is a sub-type of the PMA-6 Tx. The PMA-6b Tx may include the coil structure described above with reference to FIGS. 4 to 7.

All subtypes operate at fixed frequency within 115-150 [kHz.]. The dimensions of all sub-types have minor deviations from the original type-6 dimension parameters, in order to ensure that the magnetic field created by the Tx on the surface will be similar to all sub-types. Furthermore, the ping voltages and other parameters of all sub-types are calibrated to create similar field on the surface.

The PMA-6 Tx requires no alignment aid. Depending on the power level and thermal management strategy for the application, the PMA-6 Tx may be used without a metal carrier. The use of a metal carrier is left up to the mechanical/thermal design requirements for the product.

FIG. 17 is an exemplary of mechanical structure of the primary coil of the PMA-6 Tx.

Referring to FIG. 17, even the coil structure of the PMA-6 Tx may have three coils, just like the coil structure of the PMA-6b Tx (see FIG. 4). In this case, each of the three coils may be in a substantially rectangular-shaped frame structure in which a through hole is formed at the center. In addition, even the coil assembly of the PMA-6 Tx may include two bottom primary coils, which are arranged in a row, and a top primary coil, which is disposed on (or above) the bottom coils).

However, there may be some numerical differences between the coil structure of the PMA-6 Tx and the coil structure of the PMA-6b Tx, as shown in the following Table 3. In Table 3, a PMA-6 Tx may correspond to PMA-6 Base type, and an empty block regarding the PMA-6b Tx is interpreted as having the same value as a corresponding value of the PMA-6 (base) Tx.

TABLE 3

| Parameter | Units | Min/Max/Target/Comments | PMA-6 Base | 6a | 6b |
|---|---|---|---|---|---|
| Coils shape | | Comments | Rectangle | | |
| Outer Diameter | mm | Min | 52.7 × 44.7 | | Bottom coil: 48 × 43<br>Top coil: 48.5 × 45 |
| | | Target | 53.2 × 45.2 | | Bottom coil: 49 × 44<br>Top coil: 49.5 × 46 |
| | | Max | 53.7 × 45.7 | | Bottom coil: 50 × 45<br>Top coil: 50.5 × 47 |
| Inner Diameter | mm | Comments<br>Min | 27.0 × 19.0 | | Bottom coil: 25 × 21<br>Top coil: 20 × 24.5 |

TABLE 3-continued

| Parameter | Units | Min/Max/Target/Comments | PMA-6 Base | 6a | 6b |
|---|---|---|---|---|---|
| | | Target | 27.5 × 19.5 | | Bottom coil: 26 × 22 Top coil: 21 × 25.5 |
| | | Max | 28.0 × 20.0 | | Bottom coil: 27 × 23 Top coil: 22 × 26.5 |
| | | Comments | | | |
| Wire Diameter | mm | Min | | | |
| | | Target | φ 0.08 × 105 strands | | |
| | | Max | | | |
| | | Comments | | | |
| Turns per Layer | mm | Min | | | |
| | | Target | 12 | | Bottom coil: 11 Top coil: 12 |
| | | Max | | | |
| | | Comments | 12 turns on 1 layer (per coil) | | |
| Layers | | Min | | | |
| | | Target | 1 (per coil) | | |
| | | Max | | | |
| | | Comments | | | |
| Total Coil Winding Height | mm | Min | | | |
| | | Target | 2.1 | | |
| | | Max | 2.6 | | |
| | | Comments | | | |
| Material | | | (1) (2) | (1) (2) | (1) |

Referring to Table 3 and FIG. 17, The PMA-6 Tx may include a coil assembly that is composed of three same-sized coils (one top primary coil, and two bottom primary coils). In this case, each of the coils may be designed to have an outer width/diameter of 53.2±0.5 mm×45.2±0.5 mm and/or an inner width/diameter of 27.5±0.05 mm×19.5±0.05 mm. The outer width/diameter indicates an entire width/diameter of each coil, and the inner width indicates a width/diameter of a through hole formed inside each coil. A wire constructing the coil assembly of the PMA-6 Tx may be a set of 105 strands of sub-wires each having a thickness of 0.08 mm. In this case, the number of turns per layer may be 12, and each coil may be composed of one layer. A winding height of the total coil may be designed to be 2.1 mm to 2.6 mm.

In contrary, each bottom primary coil of the PMA-6b Tx may be designed to have an outer width/diameter of 49.0±1.0 mm×44.0±1.0 mm and/or an inner width/diameter of 26.0±1.0 mm×22.0±1.0 mm. In addition, the top primary coil of the PMA-6b Tx may be designed to have an outer width/diameter of 49.5±1.0 mm×46.0±1.0 mm and/or an inner width/diameter of 21.0±1.0 mm×25.5±1.0 mm. In addition, the number of turns per layer of a bottom primary coil of the PMA-6 Tx may be 11, and the number of turns per layer of a top primary coil of the PMA-6b Tx may be 12.

FIG. 18 is a diagram illustrating an example of a shielding material of a PMA-6 Tx in accordance with an embodiment of the present invention.

The PMA-6 primary coil shielding is a flexible or solid rectangular ferrite with nominal dimensions as described in FIG. 18 (shield extends 1-2 mm beyond the outer edge of the coil), with associated material parameters defined in Table 4. In Table 4, a PMA-6 Tx may correspond to PMA-6 Base type, and an empty block regarding the PMA-6b Tx is interpreted as having the same value as a corresponding value of the PMA-6 (Base) Tx.

TABLE 4

| Parameter | Units | Min/Max/Target/Comments | PMA-6 Base | 6a | 6b |
|---|---|---|---|---|---|
| Coil's shape | | Comments | Rectangle | | |
| Type | | Comments | Flexible | Solid | Solid | Solid |
| Outer diameter (X/Y dimension or diameter) | mm | Min | 97.5 × 54.5 | 104.4 × 54.5 | 98.4 × 54.2 | 91.0 × 51.0 |
| | | Target | 100 × 56 | 106.6 × 54.7 | 99.4 × 54.7 | 93.0 × 53.0 |
| | | Max | 102.5 × 57.5 | 108.8 × 54.9 | 100.4 × 55.2 | 95.0 × 55.0 |
| | | Comments | | | | |
| Thickness $t_{Ferrite}$ | mm | Min | 0.81 | 2.25 | 0.9 | 1.3 |
| | | Target | 0.90 | 2.5 | 1.0 | 1.4 |
| | | Max | 0.99 | 2.75 | 1.1 | 1.5 |
| | | Comments | | | | |

Referring to FIG. 18 and Table 4, a shield material for both the PMA-6 Tx and the PMA-6b Tx may be rectangular-shaped.

With respect to the PMA-6 Tx, a shielding material may be a flexible or solid property/type. In the case of having the flexible type/property, the shielding material may be designed to have a width/diameter of 100 mm±2.5 mm×56±1.5 mm and/or a thickness of 0.90 mm±0.9 mm. In the case of having the solid type/property, the shielding material may be designed to have a width/diameter of 106.6±2.2 mm×54.7±0.2 mm and/or a thickness of 2.5±0.25 mm. With respect to the PMA-6 Tx, in the case of having the flexible type/property, the shielding material may be composed of TDK FK2 and/or similar material. When having the solid type/property, the shielding material may be composed of Ferrite 44 and/or similar material.

With respect to the PMT-6b Tx, a shielding material may have a solid property/type. In this case, the shielding material of the PMA-6b Tx may be designed to have a width/diameter of 93.0±2.0 mm×53.0±2.0 mm and/or a thickness of 1.4±0.1 mm. The shielding material of the PMA-6b Tx may be composed of PM 12 of TODAISU and/or similar material.

FIGS. 19 and 20 describe a resonant circuit for the PMA-6 Tx and PMA-6b Tx Types respectively.

A resonant circuit for a Tx may include at least one capacitor, and a plurality of primary coils, wherein a specific primary coil from among the plurality of primary coils is selectively driven to generate a resonant frequency so as to wirelessly transmit power to an Rx (or charge the Rx). Such a resonant circuit may correspond to the aforementioned power conversion unit, or may be included in the power conversion unit.

The resonant circuit parameters of FIGS. 19 and 20 are indicated in Table 5 below. In Table 5, a PMA-6 Tx may correspond to PMA-6 Base type, and an empty block regarding the PMA-6b Tx may be interpreted as having the same value as a corresponding value of the PMA-6 (Base) Tx.

TABLE 5

| Parameter | Units | Min/Max/Target/Symbol | PMA-6 Base | 6a | 6b |
|---|---|---|---|---|---|
| Primary coil self-inductance (shielded) | µH | Min | 10.35 (center) 11.25 (outer) | 10.35 (center) 11.25 (outer) | 10.6 (center = outer) |
| | | Target | 11.5 (center) 12.5 (outer) | 11.5 (center) 12.5 (outer) | 11.3 (center = outer) |
| | | Max | 12.65 (center) 13.75 (outer) | 12.65 (center) 13.75 (outer) | 12 (center = outer) |
| | | Symbol | $L_{p1}, L_{p2}, L_{p3}$ | | |
| Capacitance. | nF | Min | 190.0 (center) 190.0 (outer) | | 126.5 (center = outer) |
| | | Target | 200.0 (center) 200.0 (outer) | | 133 (center = outer) |
| | | Max | 210.0 (center) | | 139.5 (center = outer) |
| | | Symbol | $C_{p1}, C_{p2}, C_{p3}$ | (note3) $C_p$ | (note3) $C_p$ |
| Parallel Capacitance. | nF | Min | 380.0 | 475.5 | n/a |
| | | Target | 400.0 | 500.0 | n/a |
| | | Max | 420.0 | 525.0 | n/a |
| | | Symbol | $C_r$ | | |
| Primary Coil AC Resistance (5 W). | Ohm | Min | | | |
| | | Target | | | |
| | | Max | 0.08 | | |
| | | Symbol | $ESR_{lp}$ | | |
| ESR of $C_p$. | mOhm | Min | | | |
| | | Target | | | |
| | | Max | 25.0 | | n/a |
| | | Symbol | $ESR_{cp}$ | | |

The resonant circuit is measured at the final mechanical configuration of the Tx design including the coil and shielding ferrite at their mechanical final position as described in FIG. 23. The Tx outer package shall not influence on the resonant circuit parameters.

Referring to FIG. 19, a resonant circuit for the PMA-6 Tx type may include three sub-resonant circuits in total, and each sub-resonant circuit may be selectively driven by a coil selection circuit. Each sub-resonant circuit may include one in-series connected inductor (L_p1, L_p2, or L_p3) and one in-series connected capacitor (C_p1, C_p2, or C_p3). The three sub-resonant circuits are connected to each other in parallel. The inductor (L_p1, L_p2, or L_p3) of each sub-resonant circuit may correspond to the aforementioned bottom/top primary coil of a coil assembly.

In contrast, referring to FIG. 20, unlike the PMA-6 Tx type resonant circuit, the resonant circuit of the PMA-6b Tx type is formed by using only one resonant capacitor (C_p). In addition, the PMA-6b Tx type resonant circuit may be configured in a form in which the parallel resonance capacitor (C_r) is excluded from the circuit of FIG. 20.

Accordingly, the resonant circuit for the PMA-6b Tx type is configured to have less capacitors, compared to the resonant circuit for a PMA-6 Tx type, and thus, it leads to low manufacturing costs and less complexity of the circuit.

Referring to Table 5, a center value for the primary coil self inductance (L_p1, L_p2, L_p3) of the resonant circuit for the PMA-6 Tx type may be designed to be 11.5±1.15 µH, and an outer value therefor may be designed to be 12.5±1.25 µH. In addition, both a center value and an outer value for the capacitance (C_p1, C_p2, C_p3) of the resonant circuit for the PMA-6 Tx type may be designed to be 200±10 nF. Furthermore, a value for the parallel capacitance (C_r) of the resonant circuit for the PMA-6 Tx type may be designed to be 400±20 nF.

In contrast, both a center value and an outer value for the primary coil self-inductance L_p1, L_p2, L_p3) of the resonant circuit for the PMA-6b Tx type may be designed to be 11.3±0.7 µH. In addition, both a center value and an outer value for the capacitance (C_p) of the resonant circuit for the PMA-6b Tx type may be designed to be 133±6.5 nF.

In a 5 W wireless power system, the PMA-6 Tx type and the PMA-6b Tx type may both have a primary coil AC resistance of 0.08Ω

FIG. 21 shows an example of a frequency full bridge driver of a resonant circuit illustrated in FIGS. 19 and 20.

The frequency full bridge driver may perform an operation of driving an individual primary coil. The frequency full bridge driver is a concept corresponding to the aforementioned full-bridge inverter, and is capable of perform a function of converting a DC signal (input voltage/current) into an AC signal and providing the AC signal to a sub-resonant circuit including a selected primary coil. The PMA-6/6b Tx may control a DC signal/input voltage (that is, input current and/or input voltage) which is to be applied to the frequency full bridge driver in order to control an amount of power to be transmitted to an Rx.

The input voltage and current to the frequency full bridge driver of FIGS. 19 and 20 are V_PMA6_input_driver and I_in_max as indicated in table 6. In Table 6, a PMA-6 Tx may correspond to a PMA-6 Base type, and an empty block regarding the PMA-6b Tx is interpreted as having the same value as that of the PMA-6 (Base) Tx.

TABLE 6

| Parameter | Units | Min/Max/Target | PMA-6 Base | 6a | 6b |
|---|---|---|---|---|---|
| $V_{PMA\_input\_driver}$ - Input voltage. | V | Min Target | 1.0 | | 2.5 |
| | | Max | 12.0 | | 15.0 |
| $I_{in}$ - Input current (per AP**). | A | Min Target | 2.1 | | 1.0 |
| | | Max | | | |
| $I_{in\_max}$ - Maximum Input current (per AP(Access Point)**) [RMS not including pulses] for power class 0. | A | Min Target Max | 2.5 | | 1.5 |
| Driver Resistance. | mOhm | Min Target Max | 30.0 | | |

Referring to Table 6, a PMA-6 Tx may be designed such that the range of an input voltage (V_PMA6_input_driver) of the frequency full bridge driver is between 1.0V and 12.0V, and that the range of the input current (I_in) is between 2.1 A (especially when a bridge voltage is 12V) and 2.5 A.

In contrast, a PMA-6b Tx may be designed such that the range of an input voltage (V_PMA6_input_driver) of the frequency full bridge driver is between 2.5V and 15.0V, and that the range of an input current (I_in) is between 1.0 A (especially when a bridge voltage is 15V) and 1.5 A.

For both the PMA-6 Tx and the PMA-6b Tx, a driver resistance of a frequency full bridge driver may be designed to be 30 mΩ.

The reason for designing as shown in Table 6 is to further increase a/an operation/charge distance of the PMA-6b Tx, and the numerical range of the increased operation/charge distance of the PMA-6b Tx is shown in the following table 8.

FIG. 22 is a diagram illustrating an example of a Tx detection/Tx Coil Sense Circuit included in a placement detection unit in accordance with an embodiment of the present invention.

A PMA-6/6b Tx shall implement the placement detector described below:

The Tx uses a pinging method, and performs a ping on each of the three coils in succession. This detection method uses a periodic short pulse applied to the primary coil. By measuring the resultant interference on the primary coil, the presence of a Rx can be detected. The pinging pulse's characteristics are as follows:

The short pulse is made up of a pack of pulse N_pulse rectangular wave pulses at a frequency pulse f_pulse with a duty cycle of pulse D_pulse.

Time between sequential packets will be t_pinging.

The active detector shall be triggered if the voltage difference between V_LC1 that is measured without a Rx present on the Tx surface and V_LC2 that is measured with a Rx placed on the Tx surface is higher than Delta_pulse.

The parameters of the PMA-6/6b Tx coil sense detection are detailed in Table 7. In Table 7, the PMA-6 Tx may correspond to a PMA-6 Base type, and an empty block regarding the PMA-6b Tx is interpreted as having the same value as that of the PMA-6 (Base) Tx.

TABLE 7

| | | PMA-6 | | |
|---|---|---|---|---|
| Parameter | Units | Base | 6a | 6b |
| $f_{pulse}$** | kHz | 110 ± 5 | | 130 ± 5 |
| $D_{pulse}$** | % | 2.5 ± 1 | | 50 ± 5 |
| $N_{pulse}$** | | 5-20 | | 5-22 |
| $t_{pinging}$ | ms | 25-400 | | 0.1-0.5 |
| $Delta_{pulse}$ | V | 0.5 | | 3.2 |
| $V_{pulse}$ | V | 2.4-5.25 | | n/a |

Referring to Table 7, among parameters of a Tx detection circuit provided in the PMA-6 Tx, an operating frequency/frequency pulse (f_pulse) may be 110±5 kHz, a duty cycle (D_pulse) may be 2.5±1%, the number of rectangular wave pulses (or the packet number of rectangular wave pulses, the number of pulses of PWM) (N_pulse) may be 5 to 20, an interval between consecutive packets (t_pinging) may be 25 to 400 ms, Delta_pulse, which is a trigger condition of an active detector may be 0.5V, and an applied voltage to bridge using detection pulse (V_pulse) may be 2.4 to 5.25V.

In contrast, among parameters of a Tx detection circuit provided in a PMA-6b Tx, an operating frequency/frequency pulse (f_pulse) may be 130±5 kHz, a duty cycle (D_pulse) may be 50±5%, the number of rectangular wave pulses (or the packet number of rectangular wave pulses, the number of pulses of PWM) (N_pulse) may be 5 to 22, an interval between consecutive packets (t_pinging) may be 0.1 to 0.5 ms and Delta_pulse, which is a trigger condition of an active detector) may be 3.2V.

FIG. 23 is a diagram illustrating an exemplary side view of a PMA-6/6b Tx in accordance with an embodiment of the present invention.

Referring to FIG. 23, the PMA-6/6b Tx may be constructed in a structure of layers stacked in a sequence with reference to the same central axis, which is the Z axis. More specifically, the PMA-6/6b Tx may have a structure in which layers are stacked on the same central axis, which is the Z axis, in a sequence as follows: of Metal Carrier→Shielding material→Primary Coil (or Coil Assembly)→User interface. However, aspects of the present invention are not limited thereto, and at least component may be excluded, a new component may be added, or the stacking sequence may be changed in accordance with an embodiment.

In this case, a parameter value for each interval between components may be determined according to a type of PMA, as shown in Table 8. In Table 8, a PMA-6 Tx may correspond to a PMA-6 Base type, and an empty block regarding the PMA-6b Tx is interpreted as having the same value as that of the PMA-6 (Base) Tx.

TABLE 8

| | | Min/Max/Target/ | PMA-6 | | |
|---|---|---|---|---|---|
| Parameter | Units | Description | Base | 6a | 6b |
| Shield Type | | | Flexible | Solid | Solid | Solid |
| $d_{inter\_surface}$ | mm | Min | 2.0 | 2.0 | 3.5 | 4.0 |
| | | Target | 3.0 | 3.0 | 4.5 | 5.5 |
| | | Max | 3.5 | 3.5 | 5.0 | 7.0 |
| $d_{Coil\_Ferrite}$ | mm | Min | | | | |
| | | Target | | | | |
| | | Max | 0.25 | 0.25 | 0.25 | 0.25 |

Referring to Table 8 and FIG. 23, in the case of the PMA-6 Tx (including both the case of having a flexible shielding material and the case of having solid shielding material), a distance (d_inter_surface) from a user interface surface to a primary coil may be designed to be 2.0 mm to 3.5 mm, and a distance (d_coil_Ferrite) from the primary coil (or the bottom surface of the primary coil) to a shielding material (or the top surface of the shielding material) may be designed to be up to 0.25 mm.

In contrast, in the case of a PMA-6b Tx, a distance (d_inter_surface) from a user interface surface to a primary coil may be designed to be 5.5±1.5 mm, and a distance (d_coil_Ferrite) from the primary coil (or the bottom surface of the primary coil) to a shielding material (or the top surface of the shielding material) may be designed to be up to 0.25 mm as the same as the PMA-6 Tx.

That is, the PMA-6b Tx has a charging/operating distance longer than that of the PMA-6 Tx, which means the PMA-6b Tx has a larger charging area.

Once a placement of an Rx is detected during the Standby Phase, a PMA-6/6b compliant Tx shall move to the Digital Ping Phase and transmit a Digital Ping signal on each primary coil in succession. The Digital Ping shall be delayed for a time period of t_PMA6_SB2DP after Rx detection (the last active analog ping signal). Following the t_PMA6_SB2DP delay period, the Tx shall transmit the Digital Ping signal. During the Digital Ping phase, PMA-6/6b Tx shall also advertise its type.

FIG. 24 is a diagram illustrating an example of a Tx digital ping operation in a digital ping phase in accordance with an embodiment of the present invention. FIG. 25 shows an advertising example of a PMA6/6b Tx type.

In FIG. 24, an arrow indicates a time interval, a dotted line indicates timing, and n indicates a type of a PMA Tx. In addition, definition/description about symbol/parameter in FIG. 24 is shown in Table 9. In Table 9, a PMA-6 Tx may correspond to a PMA-6 Base type, and an empty block regarding the PMA-6b Tx is interpreted as having the same value as that of the PMA-6 (Base) Tx.

TABLE 9

| Parameter | Units | Min/Max/Target | Symbol | PMA-6 Base | 6a | 6b |
|---|---|---|---|---|---|---|
| Transition time between Rx detection (last analog ping) and Digital Ping Phase. | ms | Min<br>Target<br>Max | $t_{PMAn\_SB2DP}$ | 23.0<br>60.0<br>250.0 | | 3000 |
| Digital Ping maximum frequency. | kHz | Min<br>Target<br>Max | $f_{PMAn\_ping\_max}$ | 109.0<br>115.0<br>121.0 | 140<br>145<br>150 | |
| Minimum frequency of the first frequency sweep. | kHz | Min<br>Target<br>Max | $f_{PMAn\_ping\_min1}$ | n/a | | |
| Duration of first sweep. | ms | Min<br>Target<br>Max | $t_{PMAn\_Sweep1}$ | 1.0<br><br>3.0 | | |
| Number of ping retries before activation High inductance ping. | | Min<br>Target<br>Max | $N_{PMAn\_Ping3}$ | 0<br>4<br>10 | n/a | |
| Number of ping retries before activation of High frequency ping. | | Min<br>Target<br>Max<br>Max | $N_{PMAn\_HF\_Ping}$ | 1<br>5<br>10 | n/a | |
| Number of pings retries. | | Min<br>Target<br>Max | $N_{PMAn\_Ping}$ | 5<br>8 | | 3<br>5 |
| Total Duration of one digital ping period. | ms | Min<br>Target<br>Max | $t_{PMAn\_ping}$ | 30.0<br><br>51.0 | | 30.0<br>50.0<br>70.0 |
| Number of valid PMA signals before transition to Identification Phase. | | Min<br>Target<br>Max | $N_{PMAn\_signals}$ | 5<br><br>15 | | |
| Transition time between Rx detection (last analog ping) and the Power Transfer Phase when all timing and communication constrains were met. | ms | Min<br>Target<br>Max | $t_{PMAn\_DP2PT}$ | 1000.0 | | |
| Transition time between Rx detection (last analog ping) and the Power Transfer Phase when not all timing and communication constrains were met. | ms | Min<br>Target<br>Max | $t_{PMAn\_DP2PT\_non\_opt}$ | 5000.0 | | |
| A Delay period from the start of the digital ping to the beginning of Advertising. | ms | Min<br>Target<br>Max | $t_{PMAn\_START\_ADV}$ | 1.0<br>3.0<br>3.0 | | |

TABLE 9-continued

| Parameter | Units | Min/Max/Target | Symbol | PMA-6 Base | 6a | 6b |
|---|---|---|---|---|---|---|
| Delay period between retransmissions of the advertising identification code. | ms | Min<br>Target<br>Max | $t_{PMAn\_Delay\_between\_adv}$ | 0.95<br>1.0<br>1.05 | | |
| Minimum time for Tx advertising transmission. | ms | Min<br>Target<br>Max | $t_{PMAn\_advertizing}$ | 19.0<br>20.0<br>21.0 | | |
| Sum of the whole advertising period. | ms | Min<br>Target<br>Max | $t_{PMAn\_START\_ADV}$ + $t_{PMAn\_advertizing}$ = $t_{PMAn\_Total\_adv}$ | 24.0 | | |
| Time Period before the end of the digital ping signal during which no advertising is performed. | ms | Min<br>Target<br>Max | $t_{PMAn\_acquire}$ | 5.0<br>27.0 | | |
| Modulation depth of Tx Type advertising. | kHz | Min<br>Target<br>Max | $M_{depth}$ | 5.0<br>10 | | |
| Length of Tx Type advertising symbol. | µs | Min<br>Target<br>Max | $t_{tx\_symbol}$ | 475.0<br>500.0<br>525.0 | | |

Referring to the FIG. 24 and Table 9, the PMA-6/6b Tx shall use a ping duration that is in the range of t_PMA6_ping.

In the first part of the Digital Ping, a bridge voltage sweep from v_PMA6_Ping_Min to v_PMA6_Ping_Max shall be generated. Total duration of this frequency sweep shall be t_PMA6_Sweep. After the frequency sweep the Tx shall advertise its type as below.

Advertising is performed as defined for PMA-6/6b Tx with the parameters defined below.

For PMA-6/6b Tx type, the following 8 bits of data coding is used as described in FIG. 25. Referring to the FIG. 25, Type Code shall be set to 00011 and/or Capability Code shall be set to XXX in order to indicate PMA-6/6b Tx type, where 'XX1' shall be set in case the designed Tx is capable of verifying the RXID of the Rx against a WPTN (Wireless Power Transfer Network), and 'XX0' will be set in case the designed Tx is not capable of verifying the received RXID. The 'XX' representing LSB (Least Significant Bit)2 and LSB1 shall be set in accordance with the Tx signaling capabilities.

Referring back to the FIG. 24 and Table 9, after t_PMA6_advertising is over, the Tx shall stop the advertising. The total advertising time period shall be no longer than t_PMA6_Total_adv. Thus, the period values that the Tx uses for different parts during advertising should be terminated correctly.

After the advertising period, the Tx shall keep the bridge voltage v_PMA6_Ping_Max for a time period of t_PMA6_acquire. During t_PMA6_acquire period, the Tx shall be able to read the data sent from the Rx.

A valid Rx response will include at least N_PMA6 signals consecutive PMA DEC signals. Any other signal received shall be interpreted as invalid response. After the reception of the valid PMA data signals, the Tx shall transition to the Identification Phase.

If no valid response is received during the first Digital Ping period, the Tx shall stop transmitting the power signal and restart the Digital Ping phase using the next successive coil.

If no valid response is received during the first N_PMA6 Ping3 pings, the Tx detects that the Rx is in an OVP (Over Voltage Protection) condition, or any combination of these conditions, the Tx shall generate a ping with a maximal voltage of V_PMA6_HI_Ping_Max. That same voltage will also be used during the Identification phase.

If the Tx only supports AirFuel Inductive operations and no valid response is received during the first N_PMA6_HF_Ping pings, the Tx detects that the Rx is responding in non-AirFuel Inductive mode, or any combination of these conditions, the Tx shall generate a ping with maximal voltage and a minimal frequency of f_PMA6_HF_ping_min. If a valid response from the Rx is detected, the Tx shall perform a frequency sweep with a duration of t_PMA6_Sweep until reaching the fixed operational frequency of PMA-6/6b Tx.

The Tx shall generate a total number of N_PMA6_Ping retries of the Digital Pings signals per coil if no valid response is received from the Rx in each of those retries. If no response received from the Rx during any of the Digital Ping signals, the Tx shall transition to the Standby Phase.

The PMA-6/6b Tx shall implement Tx type advertising as described in Table 9.

Referring to Table 9, as compared to the PMA-6 Tx, the PMA-6b Tx may be designed such that a digital ping frequency (f_PMAn_ping_max) is 145±5 kHz, that the number of ping retries (NPMAn_Ping) is 3 to 5, a transition time (t_PMAn_SB2DP) between Rx detection (last analog ping) and digital ping phase is 23 to 3000 ms and/or that a total duration of one digital ping period is 50±20 ms.

The following Table 10 defines specific parameter values for a power transfer operation of a PMA-6/6b Tx. In Table 10, a PMA-6 Tx may correspond to a PMA-6 Base type, and an empty block regarding the PMA-6b Tx is interpreted as having the same value as that of the PMA-6 (Base) Tx.

TABLE 10

| Parameter | Units | Min/Max/Target | Symbol | PMA-6 Base | 6a | 6b |
|---|---|---|---|---|---|---|
| Power transfer maximal operation frequency. | kHz | Min<br>Target<br>Max | $f_{op\_max}$ | 109.0<br>115.0<br>121.0 | | 140<br>145<br>150 |

TABLE 10-continued

| Parameter | Units | Min/Max/Target | Symbol | PMA-6 Base | 6a | 6b |
|---|---|---|---|---|---|---|
| Power transfer minimal operation frequency. | kHz | Min Target Max | $f_{op\_min}$ | 109.0 115.0 121.0 | | 140 145 150 |
| Operation frequency or voltage adjustment time window. | μs | Min Target Max | $t_{adjust}$ | 2500** | | |

Referring to Table 10, the PMA-6 may be designed to have an operating frequency of 115±6 kHz, whereas the PMA-6b Tx is designed to have a higher operating frequency of 145±5 kHz.

The drawings have been divided and described for convenience of description, but the embodiments described with reference to the drawings may be merged and designed to implement new embodiments. Furthermore, the display device is not limited and applied to the configurations and methods of the aforemtioned embodiments, but some or all of the embodiments may be selectively combined and configured so that the embodiments are modified in various ways.

Furthermore, although some embodiments of this specification have been illustrated and described, this specification is not limited to the aforementioned specific embodiments and may be modified in various ways by those skilled in the art to which this specification pertains without departing from the gist of this specification claimed in the claims. The modified embodiments should not be individually interpreted from the technical spirit or prospect of this specification.

MODE FOR INVENTION

Various embodiments have been described in the best mode for invention.

INDUSTRIAL APPLICABILITY

The present invention may be applicable to various wireless charging technologies.

The invention claimed is:

1. A wireless power transmitter that transfers power to a wireless power receiver, comprising:
a resonance circuit comprising a coil assembly and a capacitor,
wherein the coil assembly comprises first and second bottom coils placed adjacent to each other in a line and each consisting of a single layer of 11 turns and a top coil stacked on the first and second bottom coils and consisting of a single layer of 12 turns;
a frequency full bridge driver driving each coil included in the coil assembly individually, and
a placement detection unit detecting a placement of the wireless power receiver,
wherein the first and second bottom coils and the top coil have a substantially rectangular frame structure with a through hole in the center,
wherein the top coil lies on a plane surface in the middle between the first and second bottom coils,
wherein an area of the top coil is 49.5±1.0 mm ×46.0±1.0 mm, and an area of the through hole in the top coil is 21.0±1.0 mm ×25.5±1.0 mm,
wherein an area of the first and second bottom coils is 49.0±1.0 mm ×44.0±1.0 mm and an area of the through hole in the first and second bottom coils is 26.0±1.0 mm ×22.0±1.0 mm,
wherein the first and second bottom coils and the top coil have a same inductance value,
wherein the first and second bottom coils and the top coil have the same inductance value within a range of 10.6 μH to 12.0 μH,
wherein the capacitor has a capacitance value of 126.5 nF to 139.5 nF, and
wherein an operating frequency of the resonance circuit is adjusted within a range of 140 kHz to 150 kHz.

2. The wireless power transmitter of claim 1, wherein a level of power transferred to the wireless power receiver is controlled based on a level of input voltage, and input current applied to the frequency full bridge driver.

3. The wireless power transmitter of claim 2, wherein the level of input voltage applied to the frequency full bridge driver is adjusted within a range of 2.5 V to 15 V.

4. The wireless power transmitter of claim 2, wherein the level of input current applied to the frequency full bridge driver is adjusted within a range of 1 A to 1.5 A.

5. The wireless power transmitter of claim 1, wherein an operating frequency of the placement detection unit is 130±5 kHz, and a duty cycle of the placement detection unit is 50±5%.

6. The wireless power transmitter of claim 5, wherein, when the placement detection unit transmits a digital ping signal to wake up the wireless power receiver, a maximum frequency of the digital ping is 145±5 kHz.

* * * * *